(12) United States Patent
Wilczek et al.

(10) Patent No.: US 10,089,900 B2
(45) Date of Patent: Oct. 2, 2018

(54) SYSTEMS AND METHODS FOR EXPANDING HUMAN PERCEPTION

(71) Applicant: WOLFCUB VISION, INC., Cambridge, MA (US)

(72) Inventors: Frank Wilczek, Cambridge, MA (US); Mira Wilczek, Belmont, MA (US)

(73) Assignee: WOLFCUB VISION, INC., Cambridge, MA (US)

( * ) Notice: Subject to any disclaimer, the term of this patent is extended or adjusted under 35 U.S.C. 154(b) by 125 days.

(21) Appl. No.: 15/314,810

(22) PCT Filed: May 29, 2015

(86) PCT No.: PCT/US2015/033245
§ 371 (c)(1),
(2) Date: Nov. 29, 2016

(87) PCT Pub. No.: WO2015/184299
PCT Pub. Date: Dec. 3, 2015

(65) Prior Publication Data
US 2017/0116885 A1    Apr. 27, 2017

Related U.S. Application Data

(60) Provisional application No. 62/005,242, filed on May 30, 2014.

(51) Int. Cl.
*G09B 21/00* (2006.01)
*G09B 19/00* (2006.01)

(52) U.S. Cl.
CPC ....... *G09B 21/008* (2013.01); *G09B 19/0023* (2013.01)

(58) Field of Classification Search
CPC ...................................................... G09B 21/00
See application file for complete search history.

(56) References Cited

U.S. PATENT DOCUMENTS

| 2004/0136570 A1 | 7/2004 | Ullman et al. |
| 2007/0236656 A1 | 10/2007 | Jeong et al. |
| 2011/0229023 A1 | 9/2011 | Jones et al. |
| 2011/0285292 A1 | 11/2011 | Mollnow et al. |
| 2012/0242801 A1 | 9/2012 | Barnes |
| 2013/0250078 A1 | 9/2013 | Levy |
| 2013/0256518 A1 | 10/2013 | George |

FOREIGN PATENT DOCUMENTS

WO    2009052618 A1    4/2009

*Primary Examiner* — Omkar Deodhar
(74) *Attorney, Agent, or Firm* — Lando & Anastasi, LLP

(57) ABSTRACT

Media and devices that exploit the possibility of encoding multiple channels of spatially structured information into single images, by exploiting temporal modulation of color and brightness, are proposed. Applications include relief of color blindness, producing images enriched with normally "invisible" information from infrared, ultraviolet, and polarization, and effectively adding new perceptible colors within the visible spectrum.

20 Claims, 24 Drawing Sheets

| R1 | R2 | R1 | R2 | R1 | R2 |
|----|----|----|----|----|----|
| R3 | R4 | R3 | R4 | R3 | R4 |
| R1 | R2 | R1 | R2 | R1 | R2 |
| R3 | R4 | R3 | R4 | R3 | R4 |
| R1 | R2 | R1 | R2 | R1 | R2 |
| R3 | R4 | R3 | R4 | R3 | R4 |

*FIG. 9*

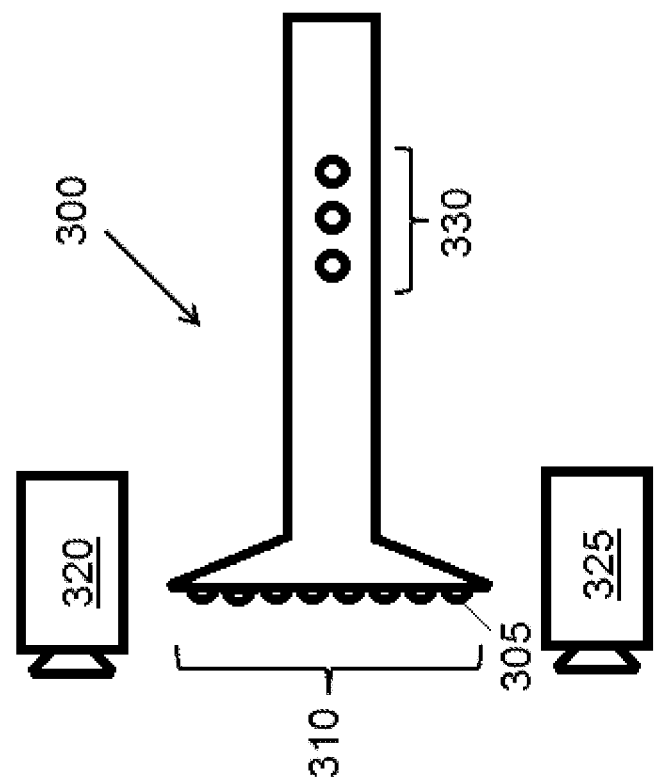
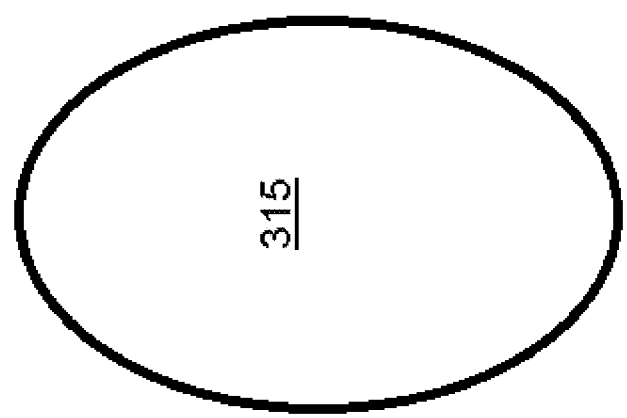
FIG. 12

SYSTEMS AND METHODS FOR EXPANDING HUMAN PERCEPTION

CROSS-REFERENCE TO RELATED APPLICATIONS

This application is a U.S. National Phase Application under 35 U.S.C. § 371 of International PCT Application Serial No. PCT/US2015/033245 filed on May 29, 2015, titled "SYSTEMS AND METHODS FOR EXPANDING HUMAN PERCEPTION," which claims priority under 35 U.S.C. § 119(e) to U.S. Provisional Patent Application Ser. No. 62/005,242, filed on May 30, 2014, titled "SYSTEMS AND METHODS FOR EXPANDING HUMAN PERCEPTION." Each of these applications is incorporated by reference herein in its entirety for all purposes.

BACKGROUND

Vision is the portal of human perception that allows the most rapid transfer of information, and our brains support many sophisticated ways of processing visual input. Yet basic physical and biological constraints have required important compromises. Aspects and embodiments disclosed herein work around those compromises, and provide for fuller use to be made of the eye/brain portal.

Normal human color vision is trichromatic. In more detail, it is based upon taking three weighted samples of intensities across the visible spectrum of electromagnetic radiation. On the other hand, physics teaches us that the spectrum is continuous, and so that there is a continuum of possible intensities. Moreover, the physical spectrum extends beyond the visible, for example to infrared and ultraviolet; and also supports the property of polarization, to which humans are essentially insensitive. Thus there is a great deal of extra information in the signals arriving at our retina, to which we are insensitive. It could be of great value, in many applications, to make that information accessible. This remark applies both to natural scenes, and to images we can enrich physically, and also potentially to images intended to present abstract information (data visualization).

SUMMARY

Aspects and embodiments of the methods and devices herein described aim to make additional channels of information associated with an image or object available to human perception by encoding it in a form that is perceptible, systematic, and localized (that is, true to the image). The meaning and importance of encoding information in a form that is "perceptible" should be well understood, but the other two properties deserve further comment. A systematic encoding, which treats many images in a common way, is important so that the encoding can be reliably interpreted, and (with practice) come to be learned and integrated into effortless perception. A localized encoding, which ties the extra information to its appropriate place in an image, is important to preserve a major advantage of human vision, i.e. our highly developed ability to interpret the spatial (as opposed to color) structure of images.

To that end several approaches are here proposed, each of which has advantages for certain applications. Central to various aspects and embodiments disclosed herein is the use of temporal structure. We exploit the possibility to add information to an image that is perceptible, systematic, and localized by imprinting appropriate time dependence upon existing (trichromatic) channels or, in some implementations, exploiting tonal encoding.

Methods of this kind can also be used to restore information that is available to normal trichromats, but lost or degraded in color blindness.

We describe implementations of these concepts using software, using illumination, using filtering (including active "filtering" or using phosphors), and using specially enabled digital displays.

Using Time to Open New Visual Information Channels

In accordance with various of the aspects and embodiments to be described below, additional channels of visual information are encoded in an image using time-dependent modulation of existing channels.

Let us first describe how this can work to ameliorate color blindness. Normal color vision is trichromatic, and people with normal color vision are called trichromats. Such people have three sorts of color receptors. Each one responds to a range of spectral colors; we refer to them by the spectral colors where their respective sensitivities peak: red, green, and blue. In the most common sort of color blindness, the subject has a mutant green receptor whose response is very similar (though not identical) to the red receptor. For most purposes in effect such people have only two independent color receptors, and they are called dichromats.

In accordance with various of the aspects and embodiments described below, we can encode the information a dichromat is missing—i.e., the difference in brightness as perceived in normal "green" and in normal "red"—as a time-dependent modification of the signals they can perceive. That signal will reveal where in the originating image the (otherwise imperceptible) difference is strong, and where it is weak. In other words, it will restore information in the originating spatial image, putting it into a form that the color blind individual can access.

That same broad strategy can be used to expand the visual information accessible to normal individuals. Thus one might encode the intensity of incoming ultraviolet light as one sort of time-dependent texture, infrared as another, or even display both at once, while retaining the integrity of the underlying image, as well as the spatial integrity of the ultraviolet and infrared signals. One can also refine perception of the visual spectrum, by obtaining and then encoding additional, independent averages from those afforded by the spectral sensitivities of the three normal receptors, and/or by obtaining and encoding information about the polarization of incoming light in different spectral regions.

One may also represent other sorts of information, not directly related to light, such as temperature, wind speed, levels of radioactivity, concentrations of chemical substances, cell types, or many others. One can also visually encode the level of uncertainty in any of those quantities. In the context of maps, one could have dynamic presentation of selected objects of interest, such as tourist destinations, gas stations, restaurants, or many others.

Software Implementations Using Digital Input from Common or Specialized Hardware For the sake of concreteness, let us begin by addressing the color blindness problem. In that case existing digital image formats already contain the information required to produce a normal image. The only issue is then to make that information perceptible to dichromats, in a way that is systematic and localized.

In one example, one encodes the difference in brightness between normal "red" and normal "green" as a shimmering texture, whose intensity is proportional to the difference red-green.

In another example, one does a time-dependent enhancement of a "red" channel of an image (or, almost equivalently, a time-dependent suppression of "green" and "blue" channels). A slight variant of this approach exploits the alpha channel of images, which controls their transparency. In this approach, one overlays a given image with a purely red image whose transparency varies in time. Both of these approaches can be implemented in computer programs that run very rapidly. This approach exploits the fact that most red-green color blind individuals have a mutated version of the green receptor, which is shifted toward red. In most natural lighting conditions this leads to the input from red and (mutated) green being nearly redundant; but reddening the scene makes it more favorable to the mutated receptor's sensitivity.

In informal tests, both these strategies have been shown to enable color blind individuals to reach essentially normal levels in standard discrimination tests (Ishihara patterns). They also report a genuine, exciting sense of expanded sensation, especially in response to the second technique.

The dynamic images thus produced have esthetic appeal even to individuals who are not color blind. They could be used for artistic purposes, including advertising and fashion design.

Implementation Using Novel Illumination Devices

One can implement similar operations directly on physical objects (as opposed to images) by illuminating the objects with novel sorts of light sources designed for this purpose. Applicant has prototyped a compact device that produces a light beam from several sub-beams in different spectral regions, with adjustable intensities and adjustable modulation frequencies in the 0-30 Hertz range. Readily available LEDs provide appropriate sources, and their intensity can be varied using standard circuitry. This can be used to generate a flexible version of the second implementation procedure of the preceding section; indeed, that software can be considered as a simulation of the effect of this hardware.

Ordinary movie-cameras can record the results of illumination using this sort of device, retaining the new information channels.

One can use digital files created in that way to recover the spectral reflectances in the ranges corresponding to the sub-beams by Fourier analysis. That information can be used as input to the software solutions described above.

One can also obtain direct, dynamic illumination in the ultraviolet or infrared, since appropriate LEDs are readily available in those spectral regions as well. Of course, reflectance of those sorts of light is not directly visible. By passing the reflected radiation through a clear viewing screen sprinkled with phosphors that fluoresce in response to the appropriate (i.e., ultraviolet or infrared) light, however, one obtains a direct physical implementation of "shimmering" as described earlier. Such sheets might be mounted in an attachment to the illumination device, or incorporated in goggles, for example.

There are also phosphors that respond selectively to spectral colors within the visible region, and those could also be used to encode the spectral intensity in the range where they respond strongly shimmering.

IMPLEMENTATION BY DYNAMIC FILTERING

One can also impose time-dependence in different spectral regions by inserting appropriate filters between the object of interest and the eyes. Electrochromic materials are one practical solution here, since they can exhibit voltage-dependent absorption in a variety of different spectral ranges. There are other plausible alternatives for implementing the basic concept, notably the possibility of mechanically adjustable (electrically controlled) interference filters, or any of several forms of "smart glass."

Ordinary movie-cameras can record the results of illumination using this sort of device, retaining the new information channels.

One can use digital files of created in that way to recover the spectral reflectances in the ranges corresponding to the sub-beams by Fourier analysis. That information can be used as input to the software solutions described above.

Implementation by Display

Time-dependent modulation of the relative intensities of standard red, green, and blue (RGB) channels, as described above under "SOFTWARE IMPLEMENTATIONS USING DIGITAL INPUT FROM COMMON OR SPECIALIZED HARDWARE," can be implemented directly in the input or output channels of modules of the kind already used to preview digital photographs for cellphone cameras, or other equivalent devices. In this way, one obtains real-time displays implementing those enhancements of color perception.

Currently it is standard practice, in digital photography, to take three spectral samples. This is the minimal number of spectral samples required to match the natural capabilities of the human visual system. At the level of fundamental photoreceptor technology, there is no major difficulty in constructing units to take additional samples. And, as discussed above, there is considerable information available through fuller spectral sampling. As we have exemplified, that information can be translated, by digital processing, into forms readily accessible to human perception, retaining the integrity of images. The enhanced images can be transmitted directly into digital displays, for example, as elements of goggles or of portable display screens.

In accordance with one aspect, a system including at least one sensor, a processor, and one or more components executable by the processor is provided. The at least one sensor is configured to detect at least one characteristic (possibly, but not necessarily, physical) of at least one subject, the characteristic being described by a measurement or more general data. The at least one processor is in data communication with the sensor. The one or more components are collectively configured to receive, from the sensor, data descriptive of the subject, the at least one characteristic or one or more secondary characteristics derived thereof, and the measurement or more general data and generate information descriptive of an artificial characteristic of the subject. The artificial characteristic represents the physical characteristic and has an attribute that varies over time as a function of the measurement.

In accordance with another aspect, there is provided a system comprising at least one sensor configured to detect at least one characteristic of an object that is not perceptible to an unaided human observer, the at least one characteristic being described by at least one measurement and at least one processor in data communication with the sensor. The system further comprises one or more components executable by the at least one processor and collectively configured to receive, from the at least one sensor, data descriptive of the object and the at least one measurement and generate an enhanced image of the object including an attribute representative of the measurement that is perceptible by the human observer, that systematically varies over time, and that is localized and faithful to a non-enhanced image of the object.

In some embodiments, the system further includes a memory. The one or more components may be further configured to store a representation of the enhanced image in the memory.

In some embodiments, the system further includes a display configured to display the enhanced image.

In some embodiments, the attribute includes a visual representation of the measurement. The attribute may include a speckled texture overlaid upon portions of the enhanced image corresponding to areas of the subject where the at least one characteristic is present.

In some embodiments, the system further includes a pointing device configured to select a portion of the enhanced image, wherein the one or more components are configured to produce an output representative of the attribute responsive to the portion of the enhanced image including the attribute. The output may comprise a visual output. The output may comprise an audible output.

In some embodiments, the one or more components are configured to set one of a frequency and a pattern of time variation of the attribute response to an intensity of the at least one characteristic.

In some embodiments, the one or more components are configured to set one of a frequency and a pattern of time variation of the attribute response to determination of a probability of the presence of the at least one characteristic.

In some embodiments, the at least one characteristic is an image of the object in an electromagnetic frequency band outside of a band of light visible to the human observer.

In some embodiments, the at least one sensor includes at least four photoreceptor types configured to detect electromagnetic radiation reflected from the object in at least four different respective frequency bands, the at least one characteristic being an image of the object in the at least four different respective frequency bands.

In accordance with another aspect, there is provided a system comprising at least one sensor configured to capture an image of an object in a bandwidth of light visible to an unaided eye of a human observer, and to capture information regarding the object that is not perceptible to the unaided eye of the human observer, and a processor configured to encode the information into a alternate format that is perceivable by the human observer, that systematically varies with time, and that is localized and does not obscure the captured image, and to generate a signal representative of an enhanced image including the captured image and the information in the alternate format.

In some embodiments, the system further includes a memory in communication with the processor and configured to store the encoded information.

In some embodiments, the processor is further configured to provide a signal to a display causing the display to produce the enhanced image of the object. The processor may be configured to cause the display to produce the enhanced image of the object in real time.

In some embodiments, the system is included in an apparatus wearable by the human observer. The apparatus may include one or more of glasses, goggles, a headband, and a hat.

In some embodiments, the system is included in a camera, wherein the display includes a viewfinder of the camera.

In some embodiments, the information regarding the object includes electromagnetic radiation reflected from the object. The system may further comprise a projector configured to project a time varying beam of the electromagnetic radiation on to the object. The projector may be configured to project the time varying beam of the electromagnetic radiation from several independently adjustable sources configured to produce electromagnetic radiation in different respective frequency bands. The at least one sensor may include at least four photoreceptor types configured to collectively detect electromagnetic radiation reflected from the object in each of the different respective frequency bands.

In some embodiments, the system further includes a screen including phosphorescent particles configured to fluoresce in response to exposure to electromagnetic radiation in one of an ultraviolet and an infrared band reflected from the object.

In some embodiments, the system further includes a plurality of independently adjustable filters disposed between the object and the at least one sensor, each of the independently adjustable filters configured to attenuate a different band of electromagnetic radiation. The system may further comprise a memory in communication with the processor and configured to store the encoded information.

In accordance with another aspect, there is provided a system for ameliorating color blindness. The system comprises a sensor configured to capture an image of an object including portions with a first color that is substantially indistinguishable from a second color by a color blind individual, the second color also present in the image, a processor configured to receive data representative of the image and to produce an enhanced image with portions of the enhanced image including the first color augmented with a localized signal that is perceivable by the color blind individual that systematically and repeatably varies with time, and a display configured to receive data representative of the enhanced image and to display the enhanced image.

In accordance with another aspect, there is provided a system comprising a memory configured to store data describing at least one non-enhanced image at least one processor in data communication with the memory, and one or more components executable by the at least one processor and collectively configured to receive, from the memory, data descriptive of the object and at least one measurement of at least one color characteristic of at least one portion of the image and generate an enhanced image of the object including an attribute representative of the measurement that is perceptible by a human observer, that systematically varies over time, and that is localized in the enhanced image and faithful to the non-enhanced image.

Still other aspects, embodiments and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 9 schematically illustrates an embodiment of a receptor array for the perception enhancement system of FIG. 8;

FIG. 12 schematically illustrates features of another embodiment of a perception enhancement system;

DETAILED DESCRIPTION

Figure 1:
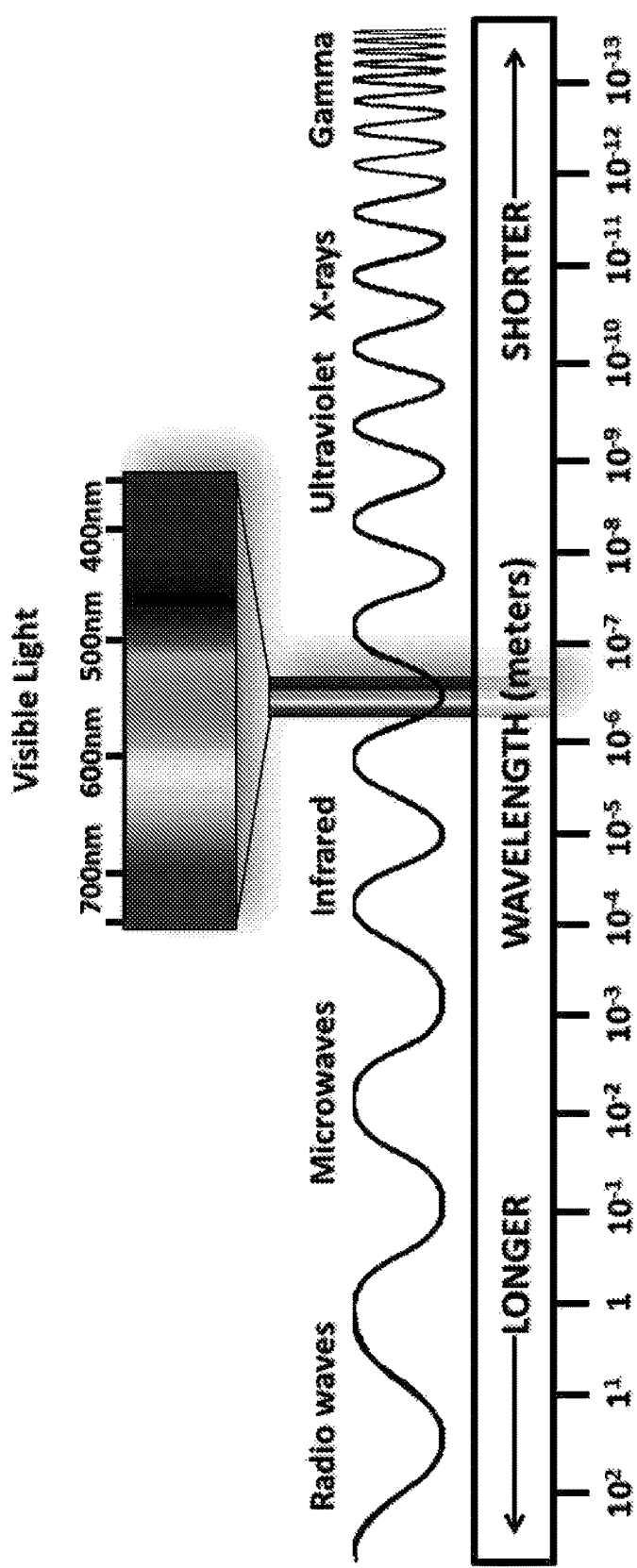
FIG. 1 illustrates the electromagnetic spectrum, and the place of visible light within it.

Aspects and embodiments disclosed herein may be utilized to encode extra channels of information, for example, light outside of the spectrum normally visible to humans, as time-dependent modulation of existing channels, for example, light that is normally visible to humans, in images and/or on objects. One particular application of aspects and embodiments disclosed herein is the amelioration of color blindness.

Normal color vision is trichromatic, and people with normal color vision are called trichromats. Such people have three sorts of color receptors. Each one responds to a range of spectral colors; we refer to them by the spectral colors where their respective sensitivities peak: red, green, and blue. In the most common sort of color blindness, the subject has a mutant green receptor whose response is very similar (though not identical) to the red receptor. For most purposes in effect such people have only two independent color receptors, and they are called dichromats.

Utilizing various of the several aspects and embodiments disclosed herein, the information a dichromat is missing (i.e., the difference in brightness as perceived in normal "green" and in normal "red") may be encoded as a time-dependent addition to the signals they can perceive. That resultant enhanced signal will reveal where the otherwise imperceptible difference is strong, and where it is weak. The resultant enhanced signal may be presented as an image in which the information in the normal spatial image that is normally imperceptible to the color blind individual is put into a form that the color blind individual can access.

A similar strategy can be used to expand the visual information accessible to normal (non color blind) individuals. For example, aspects and embodiments disclosed herein may encode and display the intensity of ultraviolet light in an image or object as one sort of time-dependent feature, infrared as another, or even display both at once, while retaining the integrity of the underlying image, as well as the spatial integrity of the ultraviolet and infrared signals. One can also refine perception of the visual spectrum, by obtaining and then encoding additional, independent averages from those afforded by the spectral sensitivities of the three normal receptors, and/or by obtaining and encoding information about the polarization of incoming light in different spectral regions.

Aspects and embodiments disclosed herein may also provide for the encoding and display of other sorts of information, not directly related to light, such as temperature, wind speed, levels of radioactivity, concentrations of chemical substances, cell types, or many others. The level of uncertainty in any of those quantities may also be encoded and displayed. For example, in the context of maps, aspects and embodiments disclosed herein may provide dynamic presentation of selected objects of interest, for example, tourist destinations, gas stations, restaurants, or many others.

Since three quantities—namely, the strength of response of the three different color receptors—are required to describe the normal human sensation of color, human color-space may be referred to as three dimensional. In this projection of a continuum of spectral colors onto the output of three receptors, distinctions among physically (spectrally) different mixtures of visible light are discarded, a phenomenon known as metamerism. Thus, for example, the perception of yellow produced by spectrally pure yellow can be reproduced by a suitable admixture of spectral red and spectral green, although those light fields are quite different physically. This feature is widely exploited in color photography, computer displays, and other representations of visual information. One can reproduce the full range of human color response additively, by use of three different sources of illumination, for example, red, green, and blue light emitting pixels, with adjustable strengths, or subtractively, by means of three different inks.

Figure 2:
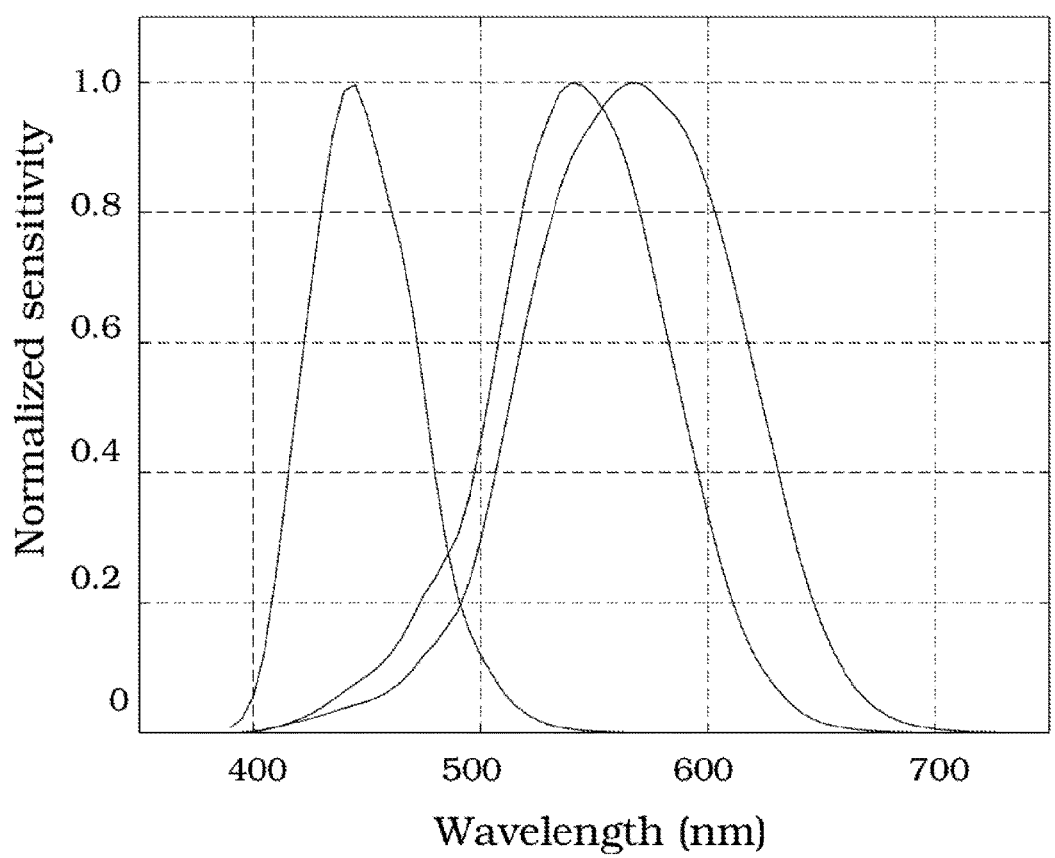
FIG. 2 illustrates the spectral sensitivity of the color sensitive cones of a normal human eye.

Human color vision is based on an all-or-nothing, Boolean response of three types of receptors. FIG. 2 shows, semi-quantitatively, the spectral sensitivity of human color receptors (cones) as a function of the wavelength of light. These receptors have different sensitivity functions, that is, different probability distributions for responding to spectral colors of different frequency. The spectral sensitivity of human rods is omitted from FIG. 2.

Figure 3:
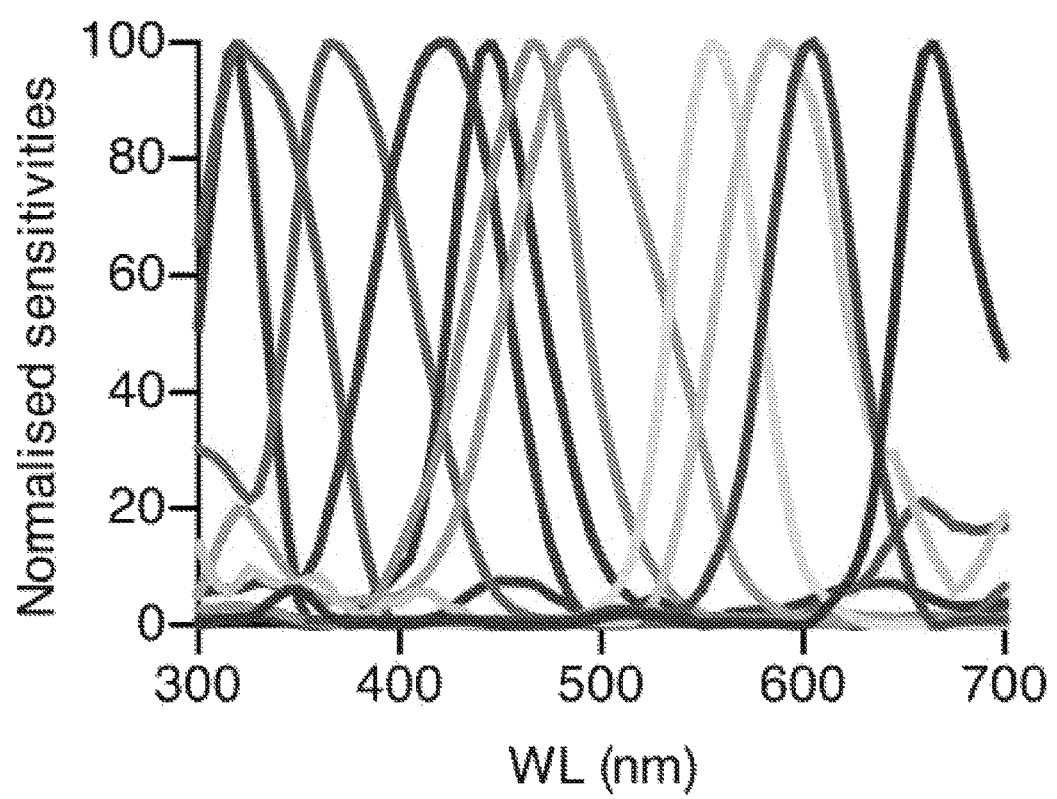
FIG. 3 illustrates the spectral sensitivity of the color sensitive receptors of the eye of a mantis shrimp.

Some birds have four kinds of color receptors, and several species of butterflies have five. Various species of mantis shrimp possess from twelve to sixteen kinds of color receptors, several of which sample ultraviolet or infrared radiation. Many of these animals are also sensitive to polarization. They use these additional sensory channels to recognize structure in flowers and plants that humans cannot perceive, and to navigate using features of the sky that humans cannot perceive. FIG. 3 shows the spectral sensitivity of mantis shrimp receptors as a function of the wavelength of light.

Human perception of color may be compared to human perception of sound. Pure tones are an analogue, for sound, of pure spectral colors. A trained human can easily perceive, in chords, the simultaneous presence of many tones, which retain their distinct identity. For example, when two different notes are simultaneously played a trained human may hear a chord, in which both notes can still be perceived separately. In contrast, when two colors are combined, the perceived result is instead a different color, in which the identity of the original two is submerged. It is as if the result of playing the notes C and G together were the note E, instead of a chord.

Human color perception is based on all-or-nothing response of three types of receptors, which respond with different sensitivity functions to all spectral colors. In this respect, color vision is much cruder than human sound perception: human color perception projects the possible "tones" into just three basic sounds, which can occur with different amplitudes. On the other hand, human visual perception produces not only colors but also images, which convey information concerning the location of objects within geometric space (localization information), while human sound perception gives only a crude representation of the spatial origin of the sounds.

By constructing artificial receptors with desired sensitivity curves, and making their output accessible to humans, aspects and embodiments disclosed herein expand human color perception. Mathematically, human visual perception projects a physically $\infty \times 2$-dimensional color space—a continuum of wavelengths, each supporting a two-dimensional space of polarizations—onto a three-dimensional sub-space. (As mentioned previously, most wavelengths are not sampled at all.) This can be compared to the projection of ordinary "geometric" three-dimensional space onto two dimensions in painting, or in the formation of images at the human retina.

Some aspects and embodiments disclosed herein leverage these insights to expand the limits of human perception. For example, according to some aspects, perception enhancement devices disclosed herein are configured to communicate, via perceptible channels, some of the spectral and polarization information of electromagnetic radiation which is normally projected out by human physiology and neurology while retaining the feature of localization (imagery).

Figure 4:
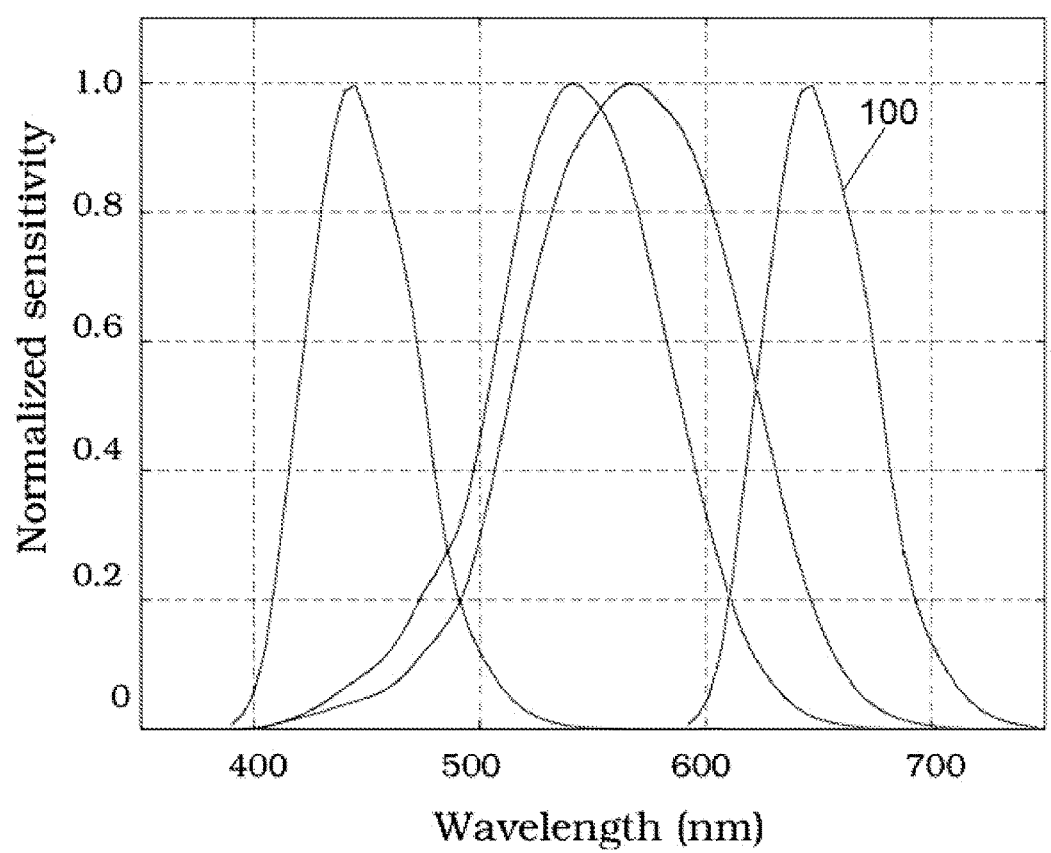
FIG. 4 illustrates the spectral sensitivity of an embodiment of an enhanced perception device.

Some embodiments in accordance with these aspects accomplish this communication by encoding the new information into forms that humans can already perceive as localized images, but using newly engineered "artificial" channels, the effect of which on human perception is illustrated as additional spectral sensitivity (e.g., curve 100 in FIG. 4). Some embodiments implement this functionality by manufacturing signals that involve imposing artificial temporal variation to provide controlled modulation of signals involving existing, natural channels. The artificial temporal variation may be perceptible, systematic, and faithful to an original image being modified by the channel including the artificial temporal variation. In more detail: The intensity of the imposed temporal modulation at a point in the image, and/or the quality of the imposed texture near that point, reflects the value of the intended additional information channel at (or very near to) that point. For example, a wavelength of light or other signal not normally visible to a subject may be represented by a temporal variation in a color that is visible to the subject superimposed on an image in which the wavelength of light or other signal is manifested. The temporal variation may be repetitive and/or include a specific pattern based on the particular wavelength of light or other signal and/or the intensity of the wavelength of light or other signal. In accordance with some embodiments, regular, time dependent modulation is used to encode additional channels of information visually, while preserving the integrity of images. Other embodiments implement this functionality using audible signals, attached to and changing with position within an image.

According to some embodiments, a perception enhancement device generates artificial characteristics to communicate physical characteristics of a subject that are difficult or impossible for humans to detect. Examples of perception enhancement devices that may be configured to perform this function include wearable devices, such as a visors, watches, or glasses. Other examples of these perception enhancement devices include cameras, computer displays, smart phones, contact lenses, headbands, retractable or non-retractable lenses that may be placed over lenses of glasses, hats with transparent or semi-transparent retractable or non-retractable displays that flip down into the field of view of the wearer, windows, or another other viewing portal. These and other perception enhancement devices configured to expand human perception may include one or more computer systems configured to detect the physical phenomenon within the environment and communicate characteristics of the physical phenomenon to one or more persons.

Enhanced Imagery

Some embodiments disclosed herein include apparatus and processes that communicate characteristics of a physical environment that are imperceptible to humans or other biological organisms with vision. For example, according to one embodiment, a perception enhancement device is configured to address the problem of restoring the information inaccessible to color blind individuals, who lack a specific receptor. Digital images prepared for people with normal vision contain the information necessary for a perception enhancement device to reconstruct the response of the missing receptor, pixel by pixel. In some embodiments, color contrast information is encoded in digital images as time-dependent modulation in other aspects of digital images to enhance their ease of perception and/or esthetic value. The device can encode the strength of that response as a "shimmering" superimposed on the image, with proportional amplitude. The shimmering may include a stochastic element. In this way, the missing color information becomes available to the color blind individual, as a different sort of visual perception, which retains the quality of an image.

More specifically, in at least one embodiment, a perception enhancement device is configured to superimpose a periodic (discrete or quasi-continuous) modulation of the signals to active receptors, whose amplitude, in a given image region, is proportional to, or depends in some other appropriate way upon, the signal that would have been supplied by the missing receptor. The perception enhancement device may implement a stochastic element within the modulation, to mimic natural shimmering. The missing color is thereby sensed as a shimmering or pulsation in the remaining colors that is strongest in portions of the image where the "missing" color is prominent. The perception enhancement device may execute this procedure pixel-by-pixel, or averaged over larger regions, using conventional displays, in software or specialized hardware.

This process for overcoming color blindness can be applied to any device or broadcast that displays visual images, including but not limited to computer graphics, web pages, mobile phones, wearable devices, television, and cinema.

In other embodiments, the perception enhancement device may overlay other indicators of a desired color (for example, a color outside the human visible range) on an image. These other indicators may include, for example, lines, circles, dots, or other shapes. These other indicators may change size, position, orientation, or one or more other attributes based on the intensity of the desired color in the associated portions of the image. In some embodiments, multiple indicators may be superimposed on an image wherein each different indicator represents a different wavelength of color, for example, one type of indicator may provide an indication of the presence of infrared light in an image while a second type of indicator provides an indication of the presence of ultraviolet light in the image.

The perception enhancement devices disclosed herein may impose temporal modulation at any of several stages in the stream of communication (e.g., either when recording, generating, or sensing signals) as will be described below.

In some embodiments, additional channels of information are encoded in digital fields attached to digital images as time-dependent modulation in digital images to enable their visual perception. For example, embodiments of the perception enhancement devices disclosed herein may use artificial channels to augment vision of visible light, or to encode information (e.g., imperceptible characteristics of an environment) that is not normally associated with color vision, including but not limited to levels of ultraviolet or infrared radiation, radioactivity, temperature, pressure, or chemical environments.

The perception enhancement devices disclosed herein may use temporal modulation to indicate the level of uncertainty in any of the physical characteristics listed above. More specifically, values that are certain can be represented as steady colors, or slow modulations, while the level of uncertainty is represented by the amplitude of flickering relative to a uniform background.

In some embodiments, perception enhancement devices disclosed herein use sound as a communication channel to supplement, or as an alternative to, temporal modulation of a visual channel. As discussed above, human visual perception and human sound perception have complementary strengths and weakness, namely that visual perception gives excellent images (spatial localization) but limited frequency information, while sound perception gives excellent frequency information but limited spatial localization. By attaching tones, chords, or simple motifs to localized areas in a digital image, one can restore spectral information, or encode other sorts of information such as the imperceptible characteristics disclosed herein. Embodiments of perception enhancement devices may include one or more mechanisms to determine a portion of an image that a subject is interested in and may convey information regarding normally imperceptible information in the portion of the image. In at least one embodiment, a perception enhancement device is configured to provide a cursor (which might be presented in response to a finger touch on a touch screen or movement of pointing device, for example, a computer mouse). In this embodiment, the perception enhancement device is configured to, in response to detecting selection of an area, communicate a sound that conveys additional localized information. In another embodiment, a perception enhancement device includes a camera configured to track the direction of a subject's gaze and communicate a sound that conveys additional localized information present in an area of the image that the perception enhancement device determines that the subject is looking at.

In other embodiments, the perception enhancement devices use tactile stimulation (e.g., vibration), to supplement, or as an alternative to, temporal modulation. By attaching vibratory patterns to localized areas in a digital image, one can restore spectral information, or encode other sorts of information such as the imperceptible characteristics disclosed herein.

In at least some embodiments, the perception enhancement devices disclosed herein include one or more computer systems, such as the computer system described below with reference to FIG. 15. An image may be provided on a display of the computer system and a subject may interact with the computer system to select different portions of the image to examine for normally imperceptible features as described herein and/or to implement other mechanisms for enhancing the subject's perception of the image. The image may be gathered using a camera or other device sensitive to wavelengths of light visible to the naked human eye as well information not normally perceivable to a human subject, for example, levels of ultraviolet or infrared radiation, radioactivity, temperature, pressure, chemical environments, or other features.

Enhanced Media

Embodiments disclosed herein may provide for the expansion of perceptual color space in the context of media, such as computer graphics, web pages, mobile phones, wearable devices, television, and cinema. In some embodiments, expansion of perceptual color is provided within an augmented reality application executing on an electronic device, for example, a head mounted display, image producing goggles or glasses, a mobile phone, or other image producing device.

Design of light microsensors with desired sensitivity functions, including polarization and extending into the infrared and ultraviolet, is a well-developed branch of engineering, as is the design of small, self-contained optical imaging systems. Smartphone cameras dramatically illustrate the basic capabilities of this technology, which continues to improve. Some embodiments disclosed herein utilize this existing technological base as described further below. Analogously, sensors that capture information from more distant regions of the electromagnetic spectrum continue to be developed and refined, that are sensitive to everything from gamma rays to ELF (extremely low frequency) signals.

For example, according to one embodiment, a perception enhancement device includes microsensors with selective sensitivity that is achieved by appropriate choice of excitable media, e.g. semiconductors with different energy gaps. In another embodiment, a perception enhancement device includes microsensors with selective sensitivity that is achieved by applying absorbing filters. In still another embodiment, a perception enhancement device includes microsensors with selective sensitivity that is achieved by a combination of appropriate excitable media and application of absorbing filters. In many embodiments of perception enhancement devices one can change sensitivity functions rapidly and in an addressable fashion by applying electric fields, as illustrated in FIG. 5A and FIG. 5B.

Figure 5A:
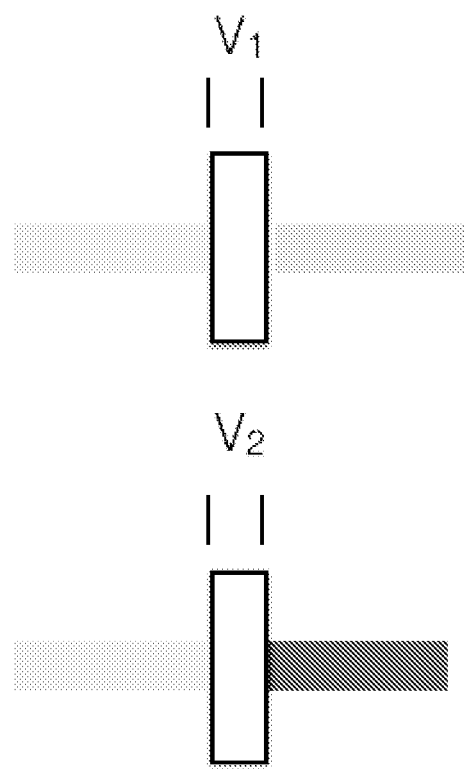
FIG. 5A is a schematic illustration of an electrochromic filter.
Figure 5B:
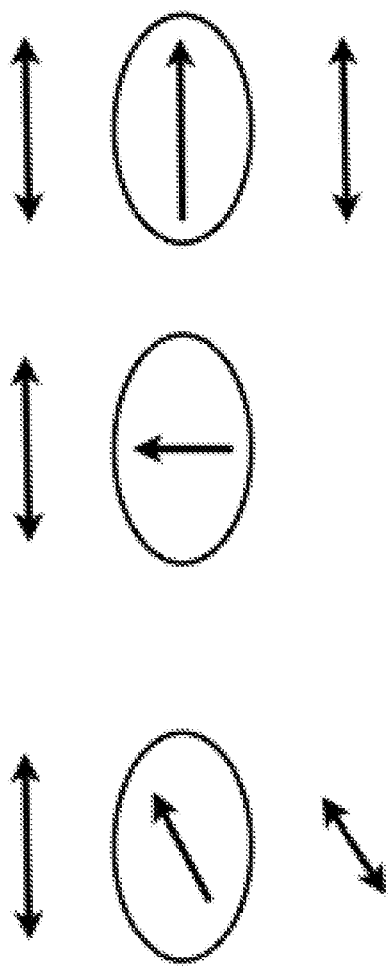
FIG. 5B is a schematic illustration of a polarization filter.

FIG. 5A and FIG. 5B illustrate examples of how two particular embodiments modulate color and polarization dependent properties of incoming light using electrical signals directly. In these figures, light is incident from the left, and emerges to the right. As shown in FIG. 5A, electrochromic materials undergo wavelength-dependent changes in absorption when subjected to different voltages. In FIG. 5A, light incident from the left will be absorbed by different amounts, depending on the voltage across the filter. As shown in FIG. 5B, liquid crystals act as filters for polarized light in a direction controlled by an applied electric field. In various embodiments, the liquid crystals allow all, none, or an intermediate amount of light through, depending on the relative orientation between the light's polarization and the applied electric field. In FIG. 5B, light with the polarization indicated to the left is absorbed by different amounts, depending on its orientation relative to the filter's axis. Examples of perception enhancement devices that include photomodulators including, for example, electrochromic materials and/or polarization filters are described further below with reference to FIGS. 8-11.

In some embodiments, a perception enhancement device is configured to produce enhanced media (e.g. computer graphics, web pages, mobile phones, television, cinema) that will be stored and later provided as enhanced reproductions of naturally perceived images, or that is presented immediately. For example, in some embodiments a perception enhancement device may produce enhanced media directed to a person with color blindness from conventional media, which is directed to a human's three different color receptor types.

In other embodiments, a perception enhancement device is configured to synthesize additional receptor types, which are sensitive to different spectral ranges and/or to different forms of polarization. As mentioned previously, polarization is an independent property of light, additional to spectral color, whose value, at a moment in time and at each position within an image, and for each spectral color, can be considered as a function of three "Stokes parameters." Receptors whose response depends both on the spectral and polarization properties of the incident light occur in the animal kingdom. Artificial receptors and generalizations thereof are designed using the same principles of material selection and selective absorption. In this way, enhanced media (e.g., an image) that contains information not directly available to human perception may be constructed and stored. The enhanced image may be captured and stored in a sensory array as sensor responses that can be read out digitally and/or transferred to a computer memory device. Examples of perception enhancement devices that include these sensory arrays are described further below with reference to FIGS. 8-11.

In other embodiments, a perception enhancement device includes materials known as electrochromics that absorb light in a manner that varies when an electric voltage is applied across them. Different electrochromics absorb preferentially in different parts of the color spectrum. In other embodiments, a perception enhancement device utilizes electrochromics as programmable absorbers (filters) with spectral sensitivity. In still other embodiments, a perception enhancement device utilizes liquid crystals to provide programmable absorbers, especially for providing programmable (electrically controlled) sensitivity to polarization.

Figure 6:
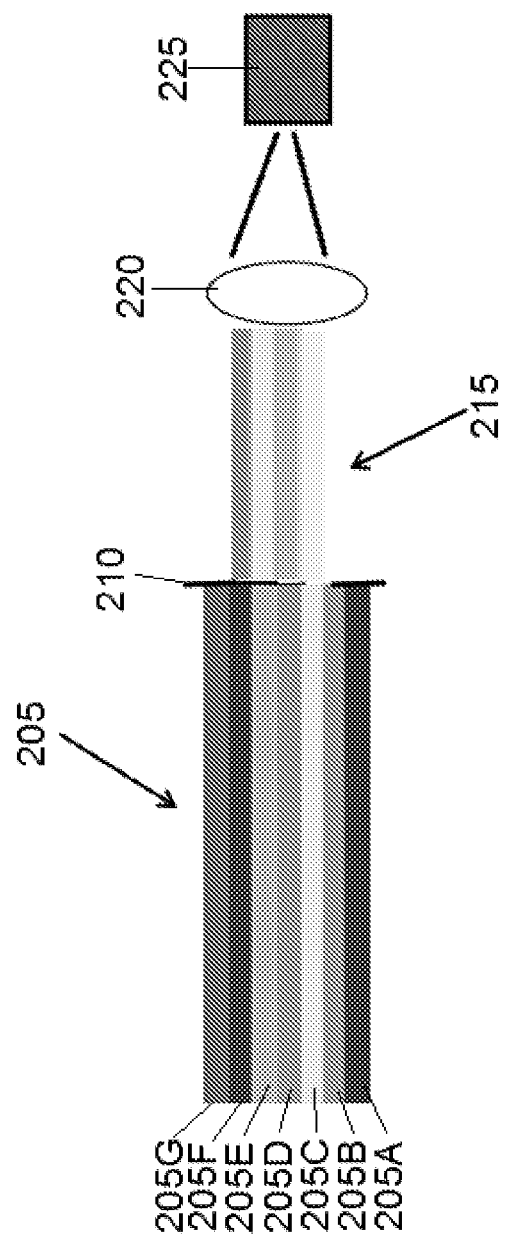
FIG. 6 is a schematic illustration of the action of a spectrally selective absorptive filter.

In other embodiments, a perception enhancement device separates different spectral channels using optical devices (e.g. lenses, stops, polarizers, etc.), and senses total response in each channel, as indicated schematically in FIG. 6. The two approaches of physical separation of channels, and selective response of sensors, are not mutually exclusive, and may be combined in some embodiments.

FIG. 6 is a conceptual representation of the concept of an artificial color receptor and a schematic representation of one possible construction according to an embodiment using conventional optical devices. As shown, an incident beam of light 205, for example, white light having a uniform mixture of all spectral colors, including, for example, light in a red band 205A, an orange band 205B, a yellow band 205C, a green band 205D, a blue band 205E, an indigo band 205F, and a violet band 205G—impinges on a color selective filter 210. Selective absorption of different wavelengths occurs at filter 210, blocking out some spectral colors altogether and diminishing others, to produce the light mixture 215. This mixture is brought into focus by lens 220, and propagates to photodetector array 225, where an image in the artificial color is detected. Examples of perception enhancement devices that include artificial color receptors, implemented using optical devices similar to that described with reference to FIG. 6, are described further below with reference to FIGS. 8-11.

In some embodiments, the perception enhancement device presents encoded information to expand human perception. For example, in one embodiment, the perception enhancement device presents a dynamic image based on the digital output from the sensor array of the sort discussed above. At least one embodiment represents at least a portion of a spectrum of normally perceivable color in the conventional way, and in the same image adds time-varying modulation (for example, "shimmering" in one or several textures, or "pulsation") to represent aspects of the additional information, for example, information describing a pattern and/or intensity of light that is normally outside the perceptual range of a person observing the image. The amplitude of the modulation, at any point in the image, may be a representative (for example, proportional) function of the intensity of the signal in the corresponding channel at that point. One can represent several distinct additional channels as shimmering, or as other indicators superimposed on an image, with different "normal" color characteristics, different temporal characteristics, or both. In some embodiments, four or more photoreceptor types are used as input to displays supporting enhanced perception through time-dependent modulation of color.

Some embodiments disclosed herein manifest an appreciation that the information necessary for relief of color blindness is already present in conventional digital images. In these embodiments, presentation of a dynamic modulation can be implemented in software, on existing computers or mobile devices, or transmitted at the level of instructions from web pages.

Some embodiments implement a standardized format for enhanced color data files that could also support dynamic presentation of non-visual information such as temperature, wind speed, levels of radioactivity, concentrations of chemical substances, or many others. In the context of maps, these embodiments may provide dynamic presentations of selected objects of interest, such as tourist destinations, gas stations, restaurants, or many others.

In other embodiments, a perception enhancement device is configured to use temporal modulation to indicate the level of uncertainty in any characteristics disclosed herein. More specifically, in some embodiments, the perception enhancement device is configured to represent values that are certain as steady colors, or slow modulations, while the level of uncertainty is represented by the amplitude of flickering, shimmering, defocusing, or other dynamic change relative to that background. One might also encode, instead of the uncertainty in some quantity, the likelihood of a contingent event, such as an extreme weather event or a mechanical failure.

The preceding processes for enhancing human perception can be applied to any device or broadcast that displays visual images, including but not limited to computer graphics, web pages, mobile phones, wearable devices, television, and cinema.

Enhanced Perception

For many purposes one might like to experience additional colors in real time, in conditions approaching natural interaction with the environment. Such purposes may include, for example, fall leaf-watching, bird-watching, butterfly-watching, enhanced appreciation of color effects in art, jewelry and fashion, and diagnosis of plant, animal, and human health.

For such purposes, some embodiments to implement the concepts explained above include one or more sensors or cameras to gather information from an object or image that may be used to provide an enhanced image to a user, for example, enhanced to display any one or more of the forms of information disclosed above. Such embodiments may include, for example, portable devices whose field of view is directed either by motions of the head (as an approximation to the direction of gaze) or by conscious direction, as with binoculars, field microscopes, telescopes, or other optical devices. Some embodiments logically separate their functionality into image gathering and image presentation.

According to one embodiment, a perception enhancement device is configured to gather images via a head-controlled image gathering apparatus having sensors attached to glasses, a headband, a hat, or some other perception enhancement device that is controlled by movement of the head. In at least some of these embodiments, the sensors need not impinge on the normal field of view.

In some embodiments, the sensors themselves could produce images based on different spectral sensitivities. For example, each sensor could represent a different channel of the sort described above. The output of each sensor could be fed into a processing unit that would be mounted on the glasses, headband, or hat.

In some embodiments, output from the processing unit, in the form of one or more sequences of real-time dynamic images, could be presented in two basic forms: at a fixed location relative to the eyes or on a separate display (e.g. a touch screen in a tablet computer). In at least one embodiment in which a perception enhancement device is configured to display dynamic images at a fixed location, the perception enhancement device displays output on one or more visible small screens attached to the glasses, headband, hat, or other optical device. In other embodiments, a display mechanism may be built into a lens of pair of glasses, a helmet, binoculars, microscope, or other optical device with which one may desire to view enhanced images. In another embodiment in which a perception enhancement device is configured to display dynamic images on a separate display, the perception enhancement devices transmits output to one or more small tablets, similar (or identical) to smartphones. Various embodiments disclosed herein thus include the production of displays that encode additional channels of information using time-dependent modulation in visual fields.

In another embodiment, the perception enhancement device executes direct intercession of subtractive media (e.g., electrochromics or liquid crystals) that is formed or attached to the surface of glasses or another optical device with which one may desire to view enhanced images and modulated under electric control. In this embodiment, the perception enhancement device provides pulsating or flickering representation (or other forms of representation as disclosed herein) of additional color channels, polarization channels, or channels including other forms of information disclosed herein, directly superimposed on the field of view. Various embodiments disclosed herein thus include the production and use of time-dependent images employing several independently adjustable filters to enhance visual perception by humans and/or recording devices. The time dependent images may be recorded as digital files or movies. The digital files or movies may be processed to produce input for software based solutions for display of the object, for example, but without limitation, using methods similar to those described in the examples below.

In another embodiment, the perception enhancement device enhances an image viewed through an optical device with additive information produced by a display mechanism. The display mechanism may include, for example a projection system that projects an image into a subject's field of view, a heads up display, a light emitting diode (LED) array disposed in or on a lens of the optical device, or any other mechanism capable of adding or overlaying an enhanced image on a "normal" image viewed through the optical device. Embodiments may include software and/or hardware modification of photographic preview displays to encode spectrum-dependent time modulation. The enhanced images may also be displayed on fixed or hand-held screens, programmed to display the image accessed by a hand-held or maneuverable probe, as might be appropriate for gathering information about hazardous conditions, about conditions in confined spaces (e.g. in medical diagnosis), or for reconnaissance, for example. One may also use auditory encoding of the information at specified places in the image, as discussed above. Here the time-dependence is encoded in the frequencies of the tone or tones emitted.

Figure 7A:
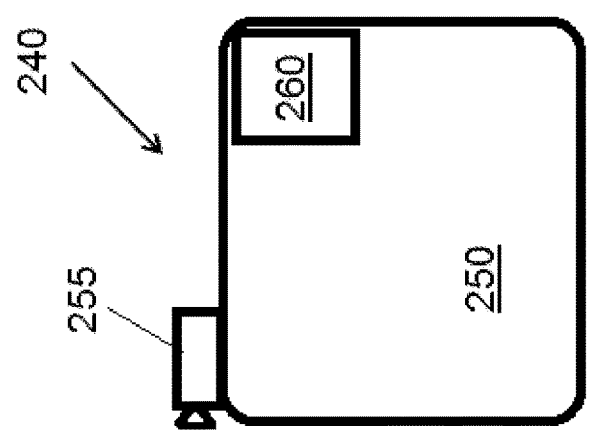
FIG. 7A schematically illustrates features of an embodiment of a perception enhancement system.
Figure 7B:
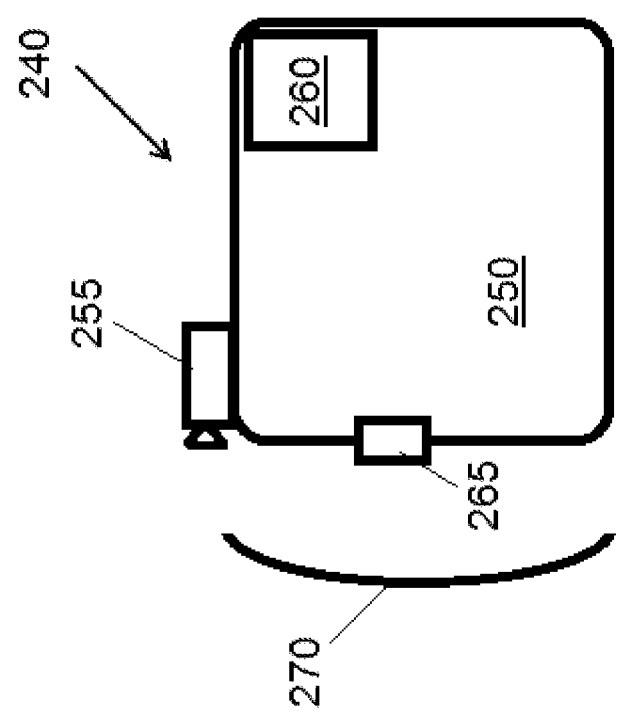
FIG. 7B schematically illustrates features of another embodiment of a perception enhancement system.
Figure 7C:
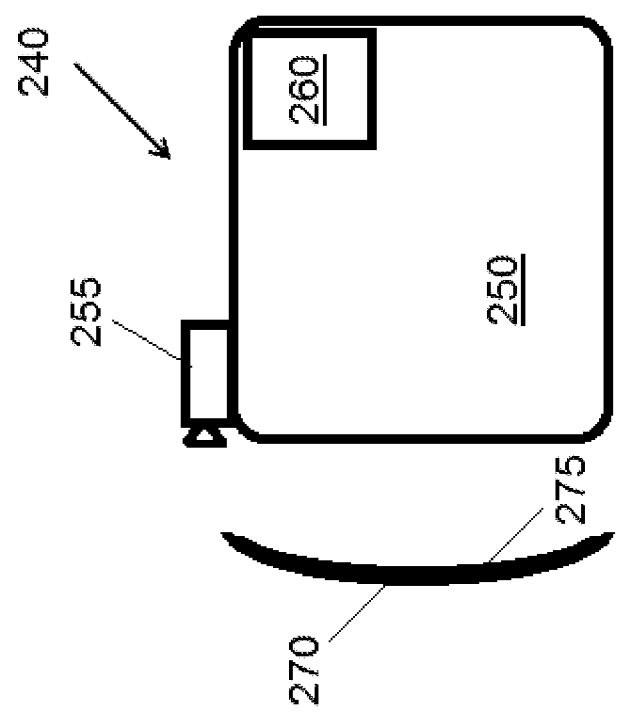
FIG. 7C schematically illustrates features of another embodiment of a perception enhancement system.

FIG. 7A schematically illustrates a wearable enhanced perception system 240 including a wearable portion 250, for example, glasses, a headband, a hat, or a helmet, a sensor 255, for example, a camera, configured to detect a band of electromagnetic radiation or other information of interest, and a processor 260 configured to encode the information detected by the sensor 255 into a human perceptible format. The sensor 255 may comprise an array or sensors and may be embedded in the wearable portion 250 or attached to an external surface of the wearable portion 250. In some embodiments, as illustrated in FIG. 7B, an image projector 265 is included in the wearable enhanced perception system 240 and is configured to project an image including the encoded information onto a lens 270 or other viewable portion of the wearable portion 250. Additionally or alternatively, as illustrated in FIG. 7C, the lens 270 or other viewable portion of the wearable portion 250 may include active elements 275, for example, an LCD or LED array or an array of electrochromic elements configured to provide an enhanced image to a user of the enhanced perception system 240.

In some embodiments configured for purposes, for example, for reconnaissance or medical diagnosis, the perception enhancement device is configured to transmit output from the processing unit to remote locations. The perception enhancement device may execute this transmission in a standardized code using standard radio or other wireless, for example, WI-FI channels.

FIGS. 8-11 illustrate features of a variety of perception enhancement devices according to various embodiments.

Figure 8:
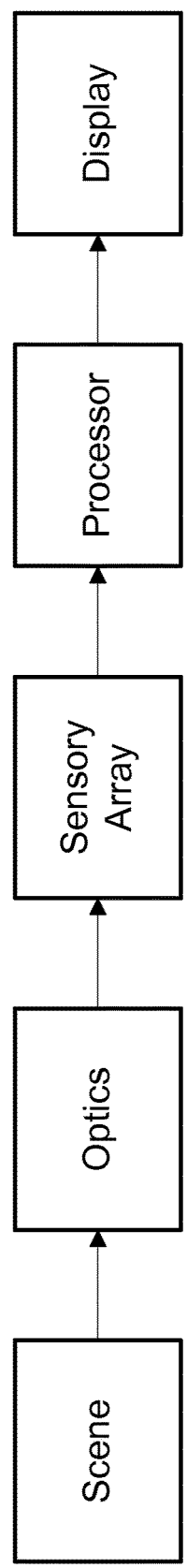
FIG. 8 schematically illustrates features of another embodiment of a perception enhancement system.

FIG. 8 illustrates, in block diagram form, a process flow for expanding perceived color space, according to the various embodiments disclosed herein. A scene is imaged in a conventional way, but the image is recorded on a sensory array that responds to more than three spectral or polarization mixtures. Output from the array, in the form of digital information, is then processed and sent forward to a display, where dynamic encoding is used to enable additional perceptual channels.

FIG. 9 is schematic representation of the sensory array used in the process of FIG. 8. The sensor array of FIG. 9 includes four types of receptors, R1, R2, R3, and R4 rather than the three used in conventional color imaging. In some embodiments each of the receptor types R1, R2, R3, and R4 may be receptive to a different band of light, on or more of which may be outside the normal human visible spectrum, for example, in the infrared or ultraviolet spectrum. Of course, the techniques described herein could also be used to take advantage of more than four receptor types.

Figure 11:
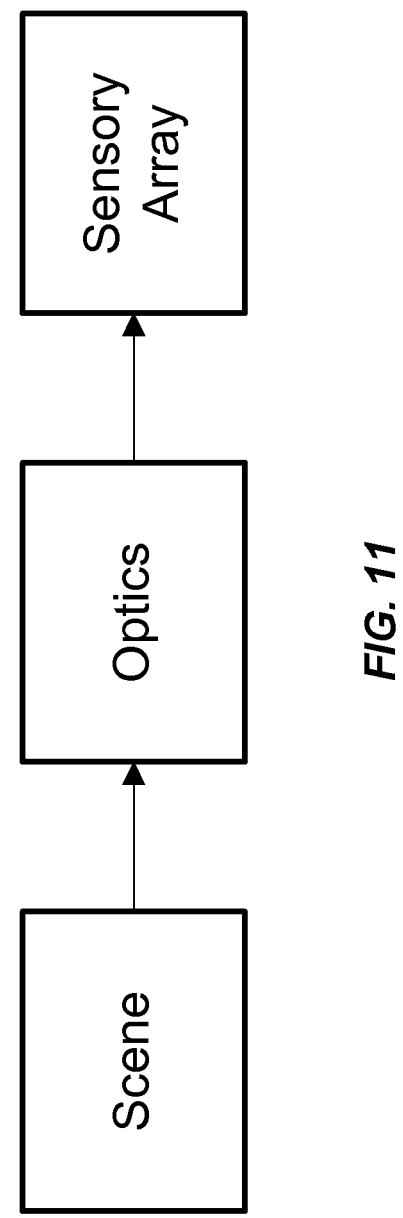
FIG. 11 schematically illustrates features of another embodiment of a perception enhancement system.

FIG. 11 is a block diagram showing the logic of an alternative process for expanding perceived color space executed by various embodiments. In this process, a small number of sensors, each corresponding to a different spectral/polarization sensitivity and each supplied with its own image-producing optics, are monitored by the processor sent forward to a display, where dynamic encoding is used to enable additional perceptual channels.

Figure 10:
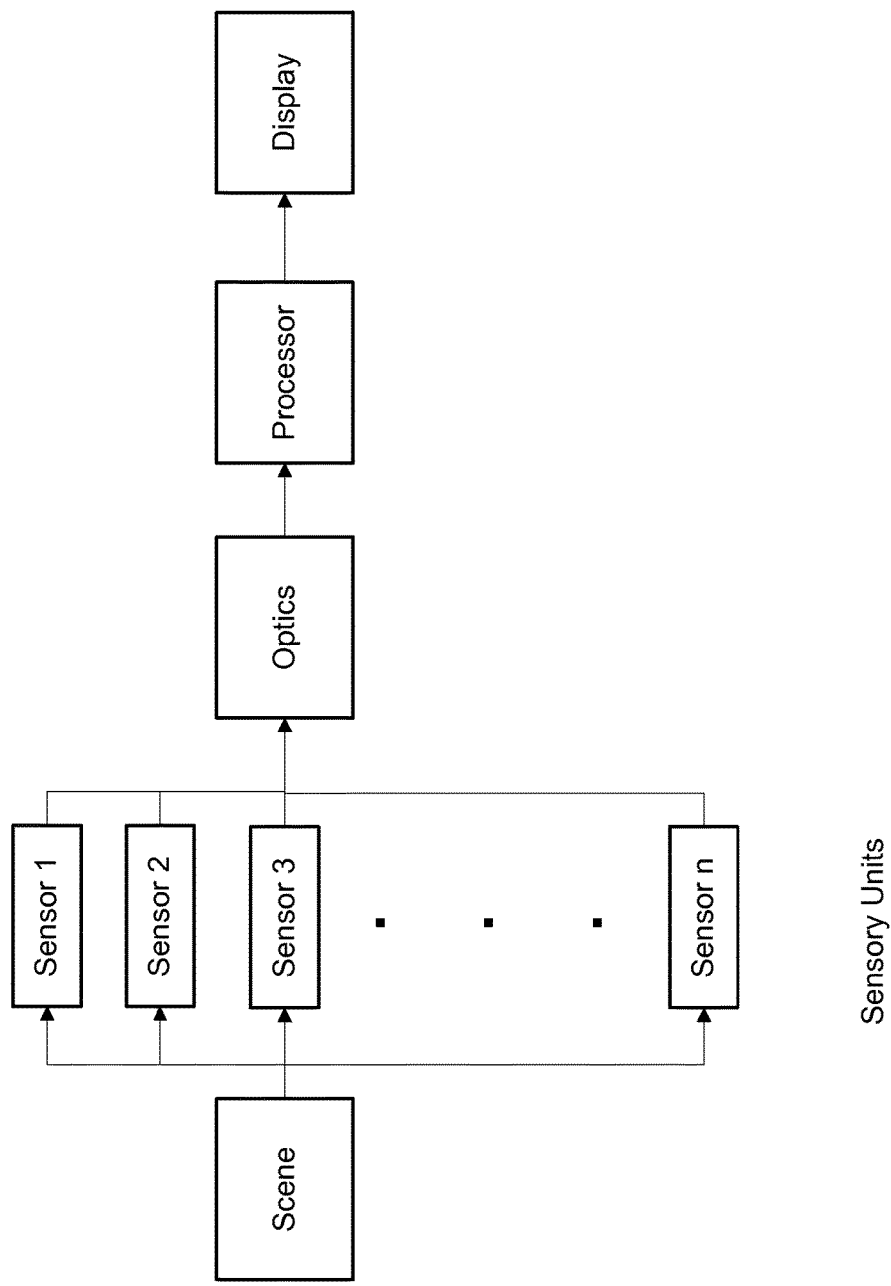
FIG. 10 schematically illustrates features of another embodiment of a perception enhancement system.

FIG. 10 is a block diagram of another process for expanding perceived color space, where electrically controlled modulators produce a dynamic image directly as implemented by various embodiments disclosed herein.

Each of the processes disclosed herein depicts one particular sequence of acts in a particular embodiment. The acts included in these processes may be performed by, or using, one or more computer systems perception enhancement as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, perception enhancement machines, namely a perception enhancement system configured according to the examples and embodiments disclosed herein.

Implementation by Illumination

One can enhance a subject's perception of physical objects, as opposed to images, by illuminating them with time-dependent light sources. For example, as illustrated in FIG. 12, an illumination device 300 may include one or more illumination elements, for example, one or more LEDs 305. In one embodiment, the LEDs output a single color of interest. In other embodiments, the one or more LEDs are included in an array 310 of LEDs that output several frequencies of electromagnetic radiation of interest (several "sub-beams"), for example, one or more of red, blue, and/or green light and/or one or more of infrared and ultraviolet light. In some embodiments, one or more filters may be utilized in the illumination device 300 so that the illumination device 300 outputs one or more sub-beams that are differently polarized. The LED array 310 may modulate the output of the different sub-beams with different time dependent repeating patterns and/or at different frequencies that are perceivable to a subject (or a recording device) and that are capable of enabling the subject to determine the reflectance of the different sub-beams by an object from observation of the different time dependent modulations. Embodiments of the illumination device 300 may thus be used for the production and use of time-dependent illumination employing several independently adjustable sources to enhance visual perception by humans and/or recording devices. In some embodiments, the illumination device 300 may be sized and shaped similar to a conventional flashlight.

In some embodiments, the illumination device 300 may output a beam whose spectral composition, including brightness of several spectral channels and the patterns (including, for example, the rate) of their variation in time can be controlled by the user, using one or more adjustment mechanisms 330, for example, several dials or sliders.

In use, the illumination device 300 may be directed toward an object of interest 315 so that the various sub-beams produced illuminate the object of interest 315. Differently colored areas of the object 315 will reflect the different sub-beams to different degrees. For example, a substantially red area of the object 315 would reflect a red-sub beam and substantially absorb a blue sub-beam, while a white area would reflect each of a red, blue, and green sub-beam. Differently colored areas of the object 315 or areas of the object 315 having different compositions or optical properties would also differently reflect infrared and ultraviolet sub-beams with different degrees of reflectance. A subject viewing the illuminated object 315 would be able to distinguish the differently colored areas of the object 315 based on the difference in intensity of the different time modulated signals reflected from the different portions of the object 315. For example, a subject having red-green color blindness observing an object 315 that was illuminated with a red sub-beam modulated at a first frequency or pattern and by a green sub-beam modulated at a second frequency or pattern could differentiate red areas of the object from green areas of the object 315 based on the different frequencies or patterns of light reflected from the different portions of the object and observed by the subject. Similarly, when the illumination device 300 is configured to output a sub-beam of polarized light, a subject could identify the portions of the object that are reflective to the polarized sub-beam based on a specific time dependent repeating pattern of the polarized sub-beam output from the illumination device 300.

In some embodiments, one or more ordinary movie-cameras 320 can record the results of illumination of an object 315 using an embodiment of the illumination device 300 as digital files and/or movies, retaining the new information channels. In other embodiments, cameras 325 sensitive to extra frequency channels, for example, infrared and/or ultraviolet light could be used to record the results of illumination of the object 315 using an embodiment of the illumination device 300 producing infrared and/or ultraviolet sub-beams. The spectral reflectances in the ranges corresponding to the various sub-beams could be digitally determined from a recording by a camera or cameras, for example, by Fourier analysis. The different spectral reflectances could then be used to produce an enhanced image of the object 315 for display in accordance with various of the embodiments disclosed herein. For example, a recording from camera or cameras 320, 325 may be processed to produce input for software based solutions for display of the object, for example, but without limitation, using methods similar to those described in the examples below.

Specific Embodiments

Figure 13:
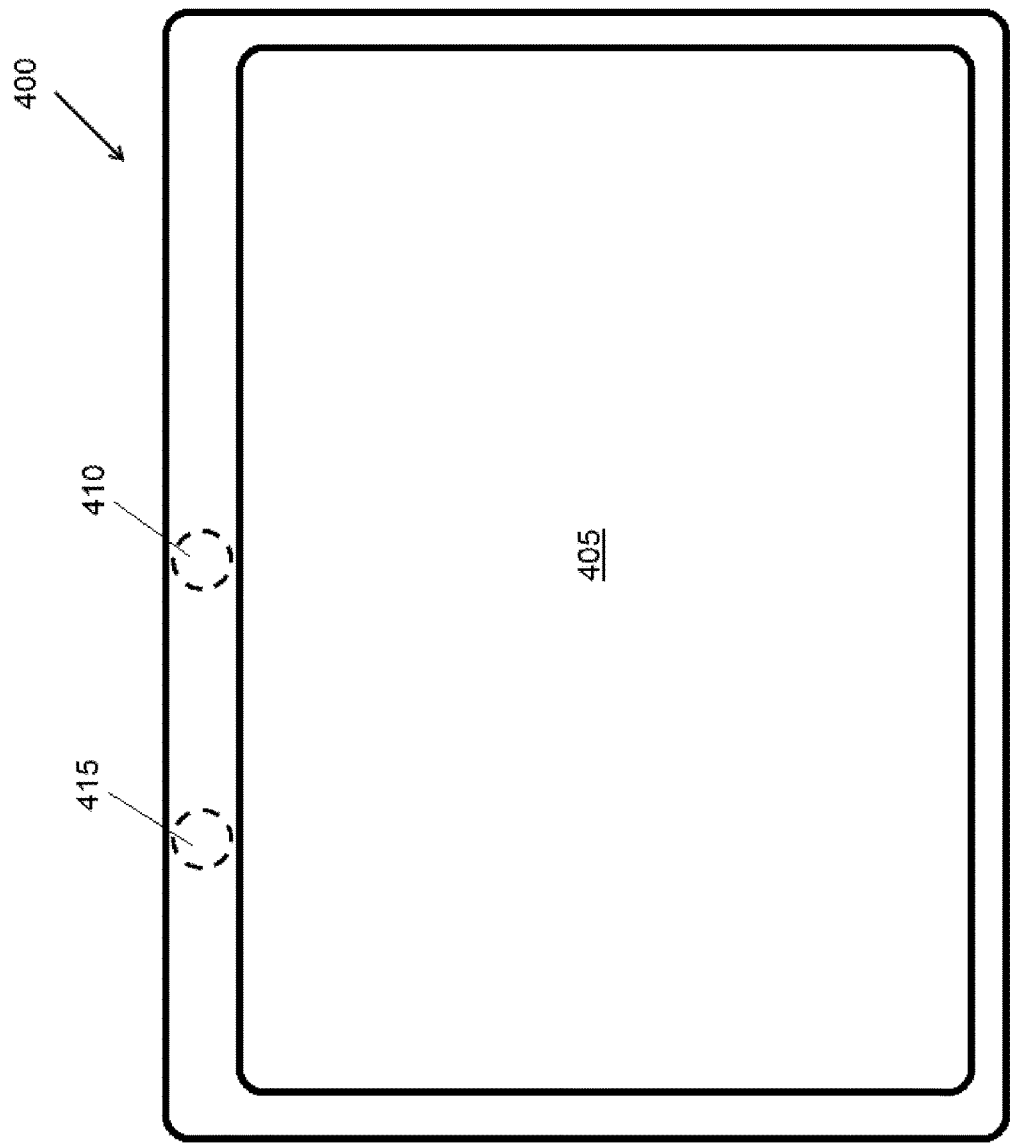
FIG. 13 schematically illustrates features of another embodiment of a perception enhancement system.
Figure 14A:
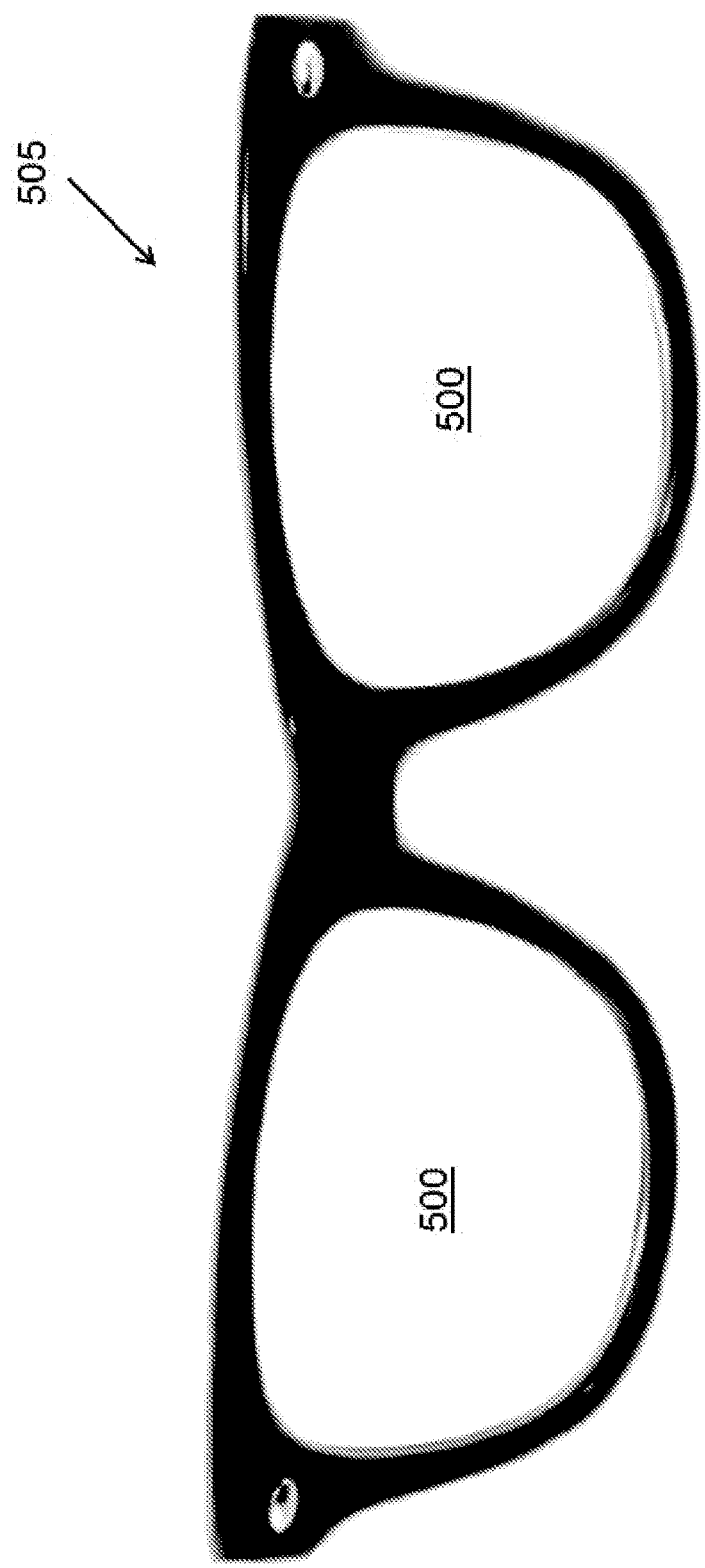
FIG. 14A illustrates an embodiment of a pair of glasses including lenses configured to provided enhanced perception of an object.
Figure 14B:
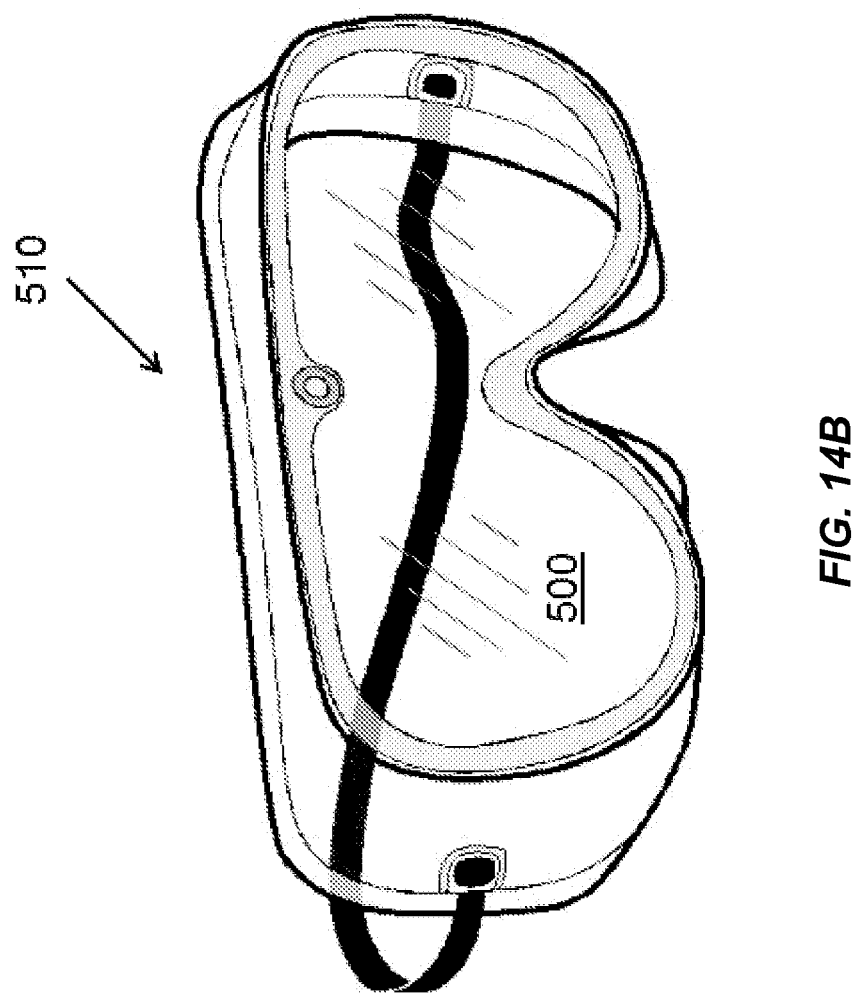
FIG. 14B illustrates an embodiment of a pair of goggles including a lens configured to provided enhanced perception of an object.
Figure 14C:
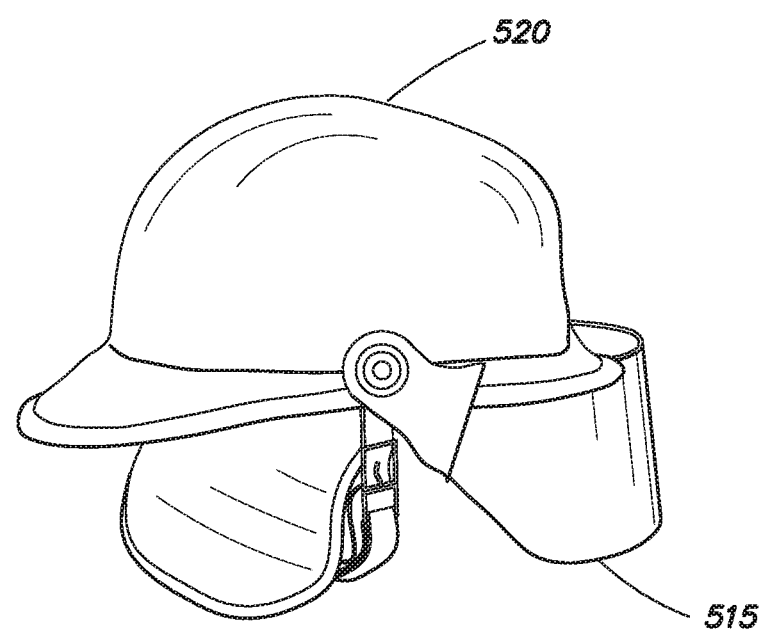
FIG. 14C illustrates an embodiment of a helmet including a visor configured to provided enhanced perception of an object.

Specific, non-limiting embodiments of perception enhancement devices configured to perform one or more of the functions disclosed herein are illustrated in FIGS. 13-14C. FIG. 13 illustrates a computer device 400 having a display 405. The computer device 400 may be any of a desktop or laptop computer, tablet, smartphone or other portable or non-portable computing device. An image may be presented on the display 405 that is enhanced to, for example, provide an indication such as shimmering, pulsing, an overlaid texture, color, or other feature on portions of the image having a first color that a color blind user may have trouble distinguishing from a second color in the image to assist the color blind user to distinguish between the first and second colors. The image may also or alternatively be enhanced to provide an indication of information not normally perceivable to the naked eye of a non color blind person. This information may be related to levels of ultraviolet or infrared radiation, radioactivity, temperature, pressure, chemical environment, or other features of an imaged item or location. In some embodiments, the computer device 400 may be a tablet or smartphone having a camera on one side and the display 405 on the other. In such embodiments, the computer device 400 may capture an image with the camera and display an enhanced version of the image in real time on the display 405. The computer device 400 may include a first camera 410 configured to capture image information in the human visible spectrum and an additional camera 415 that is capable of capturing image information, for example, ultraviolet or infrared light, that is beyond the ability of the first camera 410.

In another embodiment, a subject may observe channels of electromagnetic radiation outside of the normal range of human visual sensitivity in real time using a device including one or more types of passive elements. For example, if an object were illuminated with a time varying pattern of ultraviolet light or other frequencies of electromagnetic radiation outside the normal range of human visual sensitivity or with polarized light, the subject could observe the reflectance of the electromagnetic radiation from the object with an optical instrument including passive elements that fluoresce or otherwise react to exposure to the electromagnetic radiation to produce a human visible signal. In one embodiment, the optical instrument may include a screen or lens 500 embedded with or at least partially coated with phosphorescent material that fluoresces when exposed to ultraviolet light or other frequencies of electromagnetic radiation outside the normal range of human visual sensitivity. In some embodiments, the screen or lens embedded with or at least partially coated with phosphorescent material is sufficiently transparent in the frequency bands visually perceivable to the unaided eye to allow a subject to observe both the visible light colored portions of the object as well as the portions having the reflectance in the ultraviolet or other frequency band. In various embodiments, the screen or lens embedded with or at least partially coated with the phosphorescent material may be included in glasses 505 (FIG. 14A), goggles 510 (FIG. 14B), a visor 515 of a helmet 520 (FIG. 14C), or any other optical device. A subject could similarly observe the reflectance of polarized light from different portions of an object using polarized screen(s) or lens(es) of an optical device In a further embodiment, one or more active systems for providing an enhanced image of an object in real time may be included in glasses, goggles, a visor of a helmet, or any other optical device. These active systems may include one or more cameras capable of capturing a signal from the reflectance from an object of electromagnetic radiation in one or more frequency bands (normally human perceivable and/or normally not human perceivable) and one or more display systems for displaying the pattern of reflectance in the various frequency bands to a subject as an enhanced image. The one or more display systems may include, for example, one or more of a projection system that projects an image into a subject's field of view, a heads up display, an LED array, an electrochromic material array, or an LED array disposed in or on a lens of the optical device, or any other mechanism capable of adding or overlaying an enhanced image on a "normal" image viewed through the optical device.

Computer System

As discussed above, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, digital recording devices, and personal digital assistants) and network equipment (e.g., load balancers, routers, and switches). Examples of particular models include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 15:
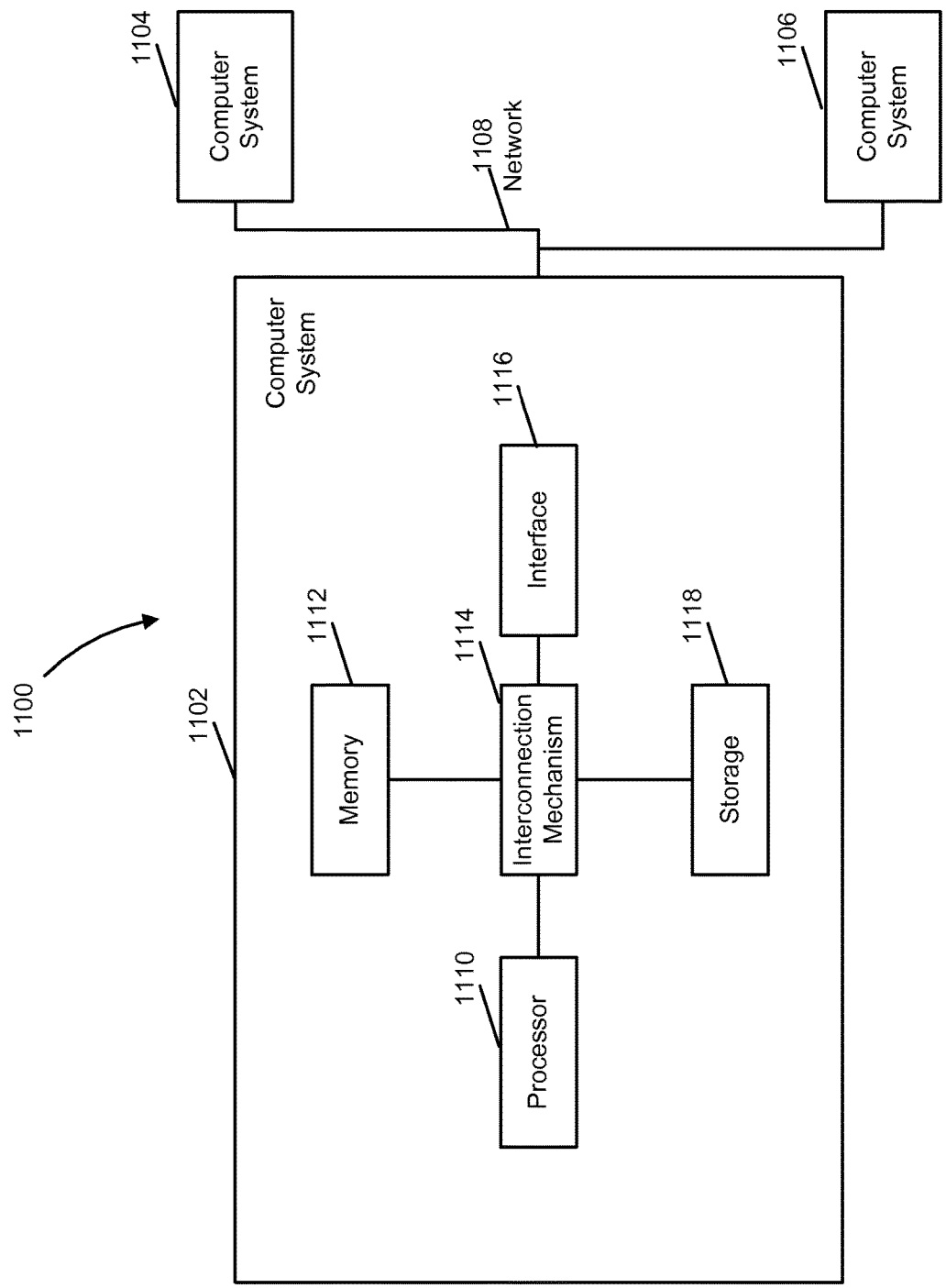
FIG. 15 schematically illustrates a computer system in which various embodiments disclosed herein may be implemented.

Referring to FIG. 15, there is illustrated a block diagram of a distributed computer system 1100, in which various aspects and functions are practiced. As shown, the distributed computer system 1100 includes one or more computer systems that exchange information. More specifically, the distributed computer system 1100 includes computer systems 1102, 1104, and 1106. As shown, the computer systems 1102, 1104, and 1106 are interconnected by, and may exchange data through, a communication network 1108. The network 1108 may include any communication network through which computer systems may exchange data. To exchange data using the network 1108, the computer systems 1102, 1104, and 1106 and the network 1108 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 1102, 1104, and 1106 may transmit data via the network 1108 using a variety of security measures including, for example, SSL or VPN technologies. While the distributed computer system 1100 illustrates three networked computer systems, the distributed computer system 1100 is not so limited and may include any number of computer systems and computing devices, networked using any medium and communication protocol.

As illustrated in FIG. 15, the computer system 1102 includes a processor 1110, a memory 1112, an interconnection element 1114, an interface 1116 and data storage element 1118. To implement at least some of the aspects, functions, and processes disclosed herein, the processor 1110 performs a series of instructions that result in manipulated data. The processor 1110 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1110 is connected to other system components, including one or more memory devices 1112, by the interconnection element 1114.

The memory 1112 stores programs (e.g., sequences of instructions coded to be executable by the processor 1110) and data during operation of the computer system 1102. Thus, the memory 1112 may be a relatively high performance, volatile, random access memory such as a dynamic random access memory ("DRAM") or static memory ("SRAM"). However, the memory 1112 may include any device for storing data, such as a disk drive or other nonvolatile storage device. Various examples may organize the memory 1112 into particularized and, in some cases, unique structures to perform the functions disclosed herein. These data structures may be sized and organized to store values for particular data and types of data.

Components of the computer system 1102 are coupled by an interconnection element such as the interconnection element 1114. The interconnection element 1114 may include any communication coupling between system components such as one or more physical busses in conformance with specialized or standard computing bus technologies such as IDE, SCSI, PCI and InfiniBand. The interconnection element 1114 enables communications, including instructions and data, to be exchanged between system components of the computer system 1102.

The computer system 1102 also includes one or more interface devices 1116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, image projectors, speakers, network interface cards, digital image sensors, chemical sensors, hard radiation sensors, eye tracking cameras, etc. Interface devices allow the computer system 1102 to exchange information and to communicate with external entities, such as users and other systems.

The data storage element 1118 includes a computer readable and writeable nonvolatile, or non-transitory, data storage medium in which instructions are stored that define a program or other object that is executed by the processor 1110. The data storage element 1118 also may include information that is recorded, on or in, the medium, and that is processed by the processor 1110 during execution of the program. More specifically, the information may be stored in one or more data structures specifically configured to conserve storage space or increase data exchange performance. The instructions may be persistently stored as encoded signals, and the instructions may cause the processor 1110 to perform any of the functions described herein. The medium may, for example, be optical disk, magnetic disk or flash memory, among others. In operation, the processor 1110 or some other controller causes data to be read from the nonvolatile recording medium into another memory, such as the memory 1112, that allows for faster access to the information by the processor 1110 than does the storage medium included in the data storage element 1118. The memory may be located in the data storage element 1118 or in the memory 1112, however, the processor 1110 manipulates the data within the memory, and then copies the data to the storage medium associated with the data storage element 1118 after processing is completed. A variety of components may manage data movement between the storage medium and other memory elements and examples are not limited to particular data management components. Further, examples are not limited to a particular memory system or data storage system.

Although the computer system 1102 is shown by way of example as one type of computer system upon which various aspects and functions may be practiced, aspects and functions are not limited to being implemented on the computer system 1102 as shown in FIG. 15. Various aspects and functions may be practiced on one or more computers having a different architectures or components than that shown in FIG. 14. For instance, the computer system 1102 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 1102 may be a computer system including an operating system that manages at least a portion of the hardware elements included in the computer system 1102. In some examples, a processor or controller, such as the processor 1110, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 1110 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Information may flow between any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

EXAMPLES

Time Varying Pattern Superimposition

Figure 16A:
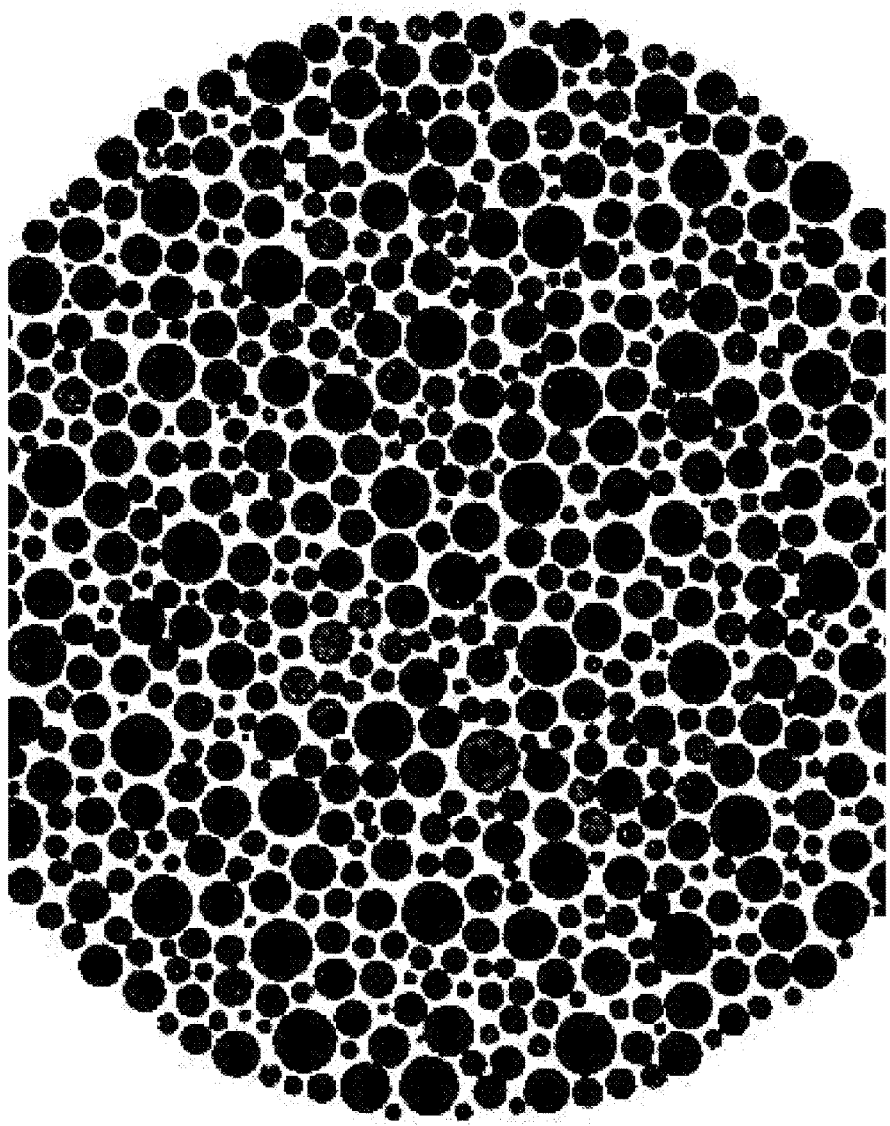
FIG. 16A illustrates an embodiment of an Ishihara diagram as would be perceived by a color-blind individual.
Figure 16B:
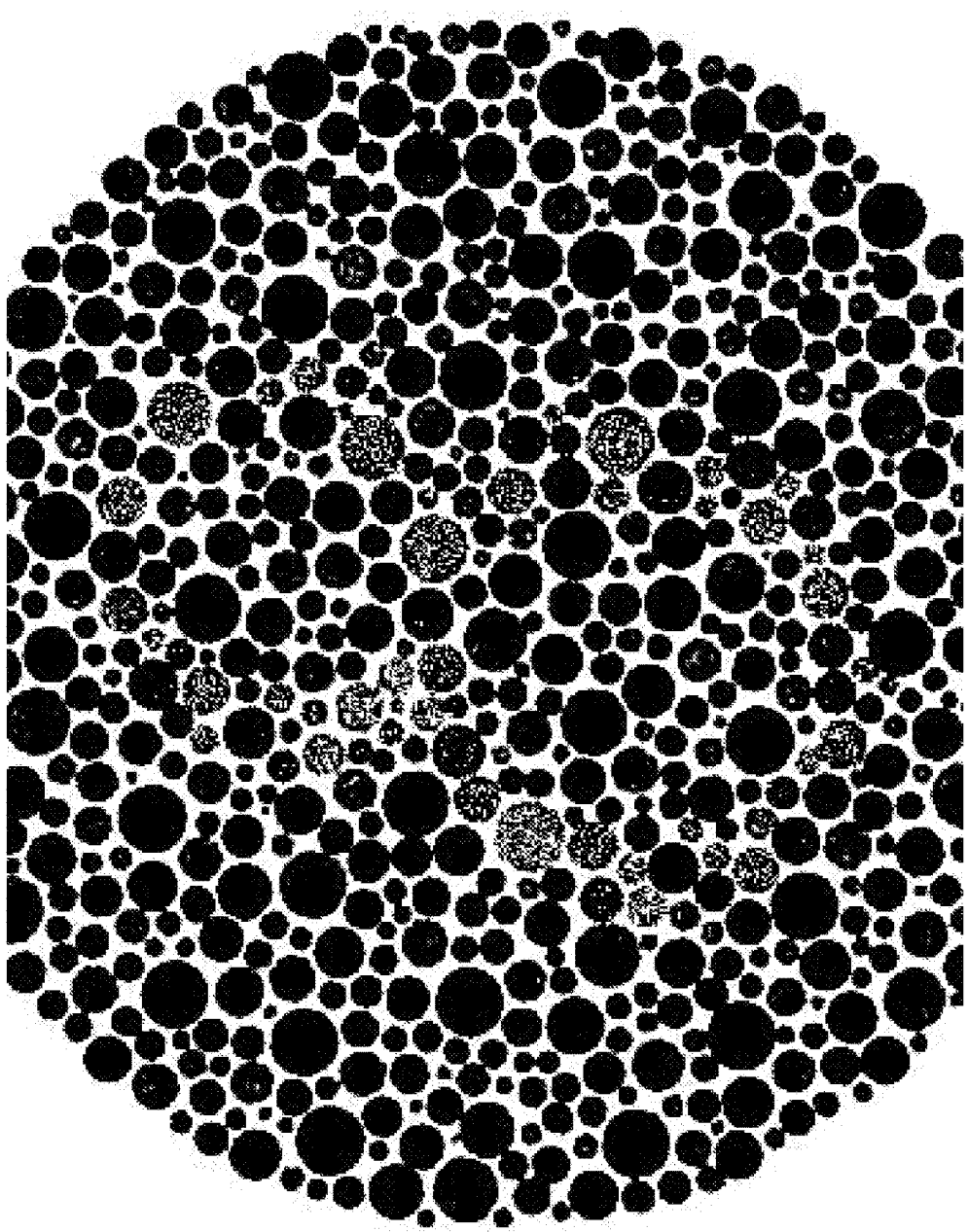
FIG. 16B illustrates an enhanced embodiment of the diagram of FIG. 16A.

In one example of ameliorating color blindness, a first color that a color blind subject normally cannot distinguish from a second color may be indicated in an image by superimposing a time dependent "shimmering" texture on portions of the image including the first color. For example, a subject with red-green color blindness unable to distinguish red from green may be presented with an image where red areas (areas of the first color) include a "shimmering" effect superimposed on the red areas. In some embodiments, the intensity of the "shimmering" may be proportional to the difference between the red-green difference in the relevant areas, i.e., the amount of "redness" in the relevant areas. FIGS. 16A and 16B illustrate an example, in the form of an Ishihara color blindness test image. In actual implementations the image would include red regions and green regions. In a colored version of the image, the number 8 is presented formed from red circles in a central region of the image while the remaining circles are colored in various shades of green. FIG. 16A illustrates how the figure would appear to a subject having red-green color blindness. FIG. 16A was created by replacing the red and green channels in an RGB display with their average. To enable a subject having red-green color blindness to perceive the number 8 in the figure, a speckled pattern is superimposed on the red dots making up the number 8 as illustrated in FIG. 16B. The speckled pattern changes with time, providing a "shimmering" image of the number 8 that can be perceived by the color blind subject. The intensity and/or rate of change in the pattern of speckles may be dependent on the intensity of the red component of the dots. In alternative embodiments, the speckles may be replaced or augmented with other shapes, for example dots or lines that move and/or change size with time. It should be appreciated that these black-and-white, static images convey the idea behind the dynamic, color images extensively described in the herein, but of course do not have their visual impact.

Time Varying Color Enhancement

Figure 17A:
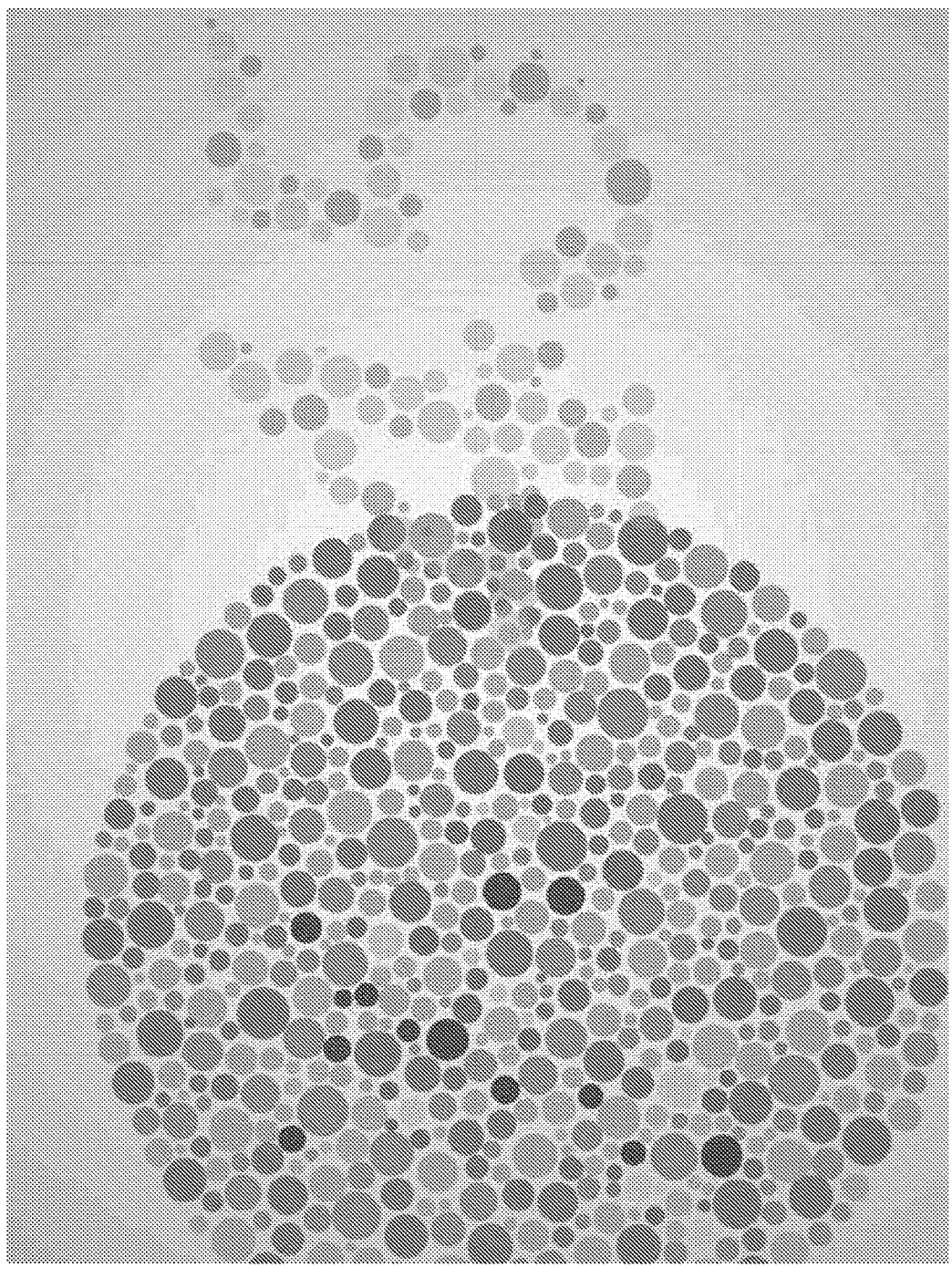
FIG. 17A illustrates another an Ishihara diagram as would be perceived by a color-blind individual.
Figure 17B:
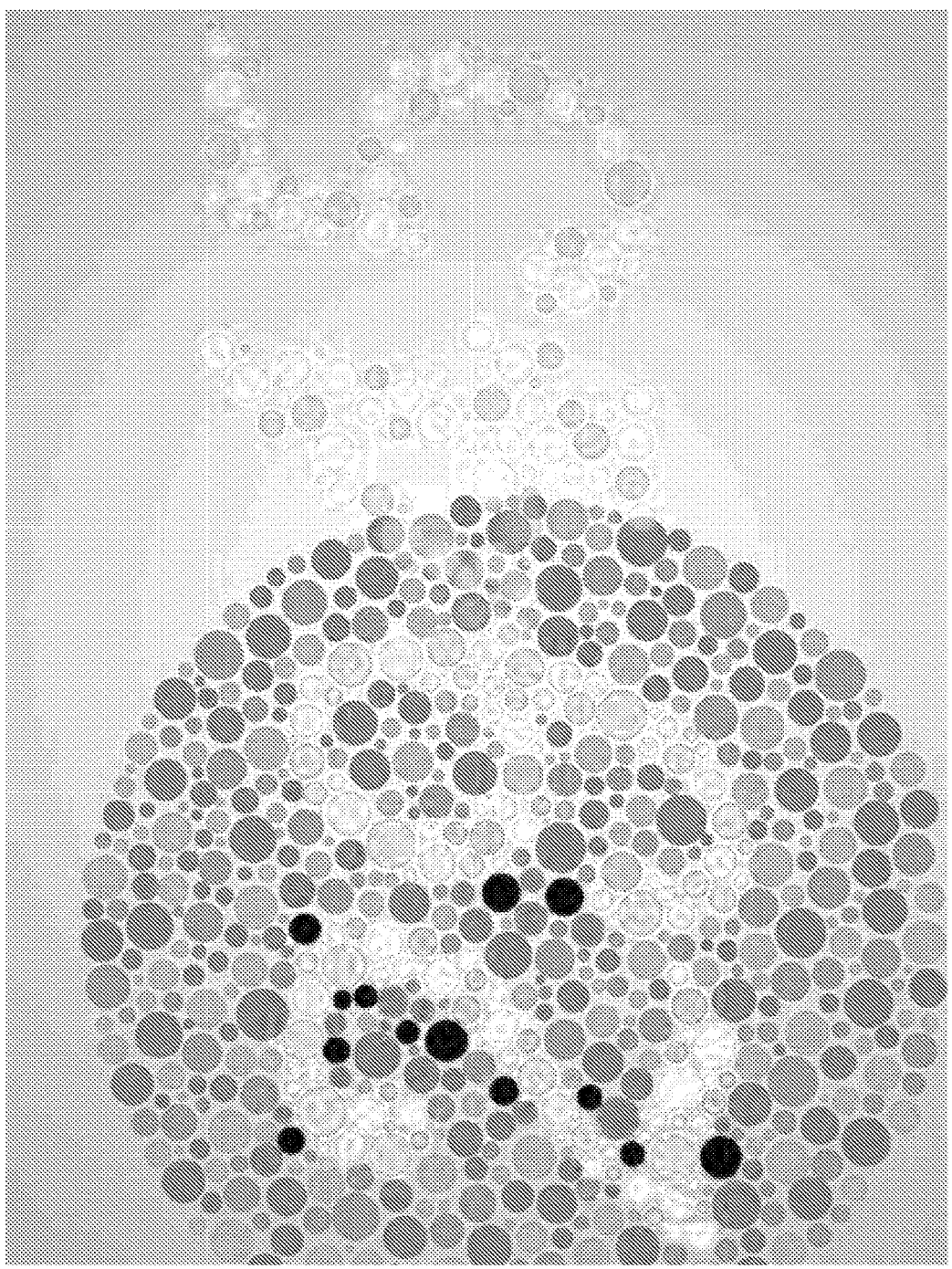
FIG. 17B illustrates an enhanced embodiment of the diagram of FIG. 17A.

In another example of ameliorating color blindness, a color blind subject is presented with an image including features colored in a first color, for example, red that the subject cannot distinguish from a second color in the image, for example, green. For example, a subject having red-green color blindness might perceive the image illustrated in 17B, having a "29" formed from dots of the illustrated Ishihara diagram, as the image illustrated in FIG. 17A where the "29" is not distinguishable. FIG. 17A was created by replacing the red and green channels in an RGB display with their average. A time dependent enhancement of the first color, for example, red is applied to the image. Over time, the image transitions from having a "normal" unenhanced coloring, for example, as illustrated in FIG. 17A, to a coloring where the first color is enhanced throughout the image, for example, as illustrated in FIG. 17B. In some examples, the red or green (or other color) balance of the image may be adjusted up and down in a repetitive time dependent manner It has been observed that this form of manipulation of the colors of an image provides for color blind subjects to be able to distinguish differences between colored areas of the image that they could not distinguish in the normal unenhanced image. Again, it should be appreciated that these black-and-white, static images convey the idea behind the dynamic, color images extensively described in the herein, but of course do not have their visual impact.

Having thus described several aspects of at least one example, it is to be appreciated that various alterations, modifications, and improvements will readily occur to those skilled in the art. For instance, examples and embodiments disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
a projector configured to project a beam of electromagnetic radiation on to an object;
at least one sensor configured to detect at least one characteristic of the electromagnetic radiation that is reflected from the object that is not perceptible to an unaided human observer, the at least one characteristic being described by at least one measurement;
at least one processor in data communication with the sensor;
one or more components executable by the at least one processor and collectively configured to:
receive, from the at least one sensor, data descriptive of the object and the at least one measurement; and
generate an enhanced image of the object including an attribute representative of the measurement that is perceptible by the human observer, that systematically varies over time, and that is localized and faithful to a non-enhanced image of the object.

2. The system of claim 1, wherein the projector is configured to project a time varying beam of the electromagnetic radiation on to the object.

3. The system of claim 2, wherein the projector is configured to project the time varying beam of the electromagnetic radiation from several independently adjustable sources configured to produce electromagnetic radiation in different respective frequency bands, one of a brightness, a frequency, and a pattern of time variation of electromagnetic radiation emitted by each of the sources being independently adjustable.

4. The system of claim 1, wherein the attribute includes a visual representation of the measurement.

5. The system of claim 4, wherein the attribute includes a speckled texture overlaid upon portions of the enhanced image corresponding to areas of the subject where the at least one characteristic is present.

6. The system of claim 1, further comprising a pointing device configured to select a portion of the enhanced image, wherein the one or more components are configured to produce an audible output representative of the attribute responsive to the portion of the enhanced image including the attribute.

7. The system of claim 6, wherein one of a tone or a pattern of the audible output varies based upon a wavelength of electromagnetic radiation emitted by the portion of the enhanced image.

8. The system of claim 1, wherein the one or more components are configured to set one of a frequency and a pattern of time variation of the attribute in response to an intensity of the at least one characteristic.

9. The system of claim 1, wherein the one or more components are configured to set one of a frequency and a pattern of time variation of the attribute in response to determination of a probability of the presence of the at least one characteristic.

10. The system of claim 1, wherein the at least one characteristic is an image of the object in an electromagnetic frequency band outside of a band of light visible to the human observer.

11. The system of claim 1, wherein the at least one sensor includes at least four photoreceptor types configured to detect electromagnetic radiation reflected from the object in at least four different respective frequency bands, the at least one characteristic being an image of the object in the at least four different respective frequency bands.

12. The system of claim 1, further including a plurality of independently adjustable filters disposed between the object and the at least one sensor, each of the independently adjustable filters configured to attenuate a different band of electromagnetic radiation.

13. A system comprising:
a projector configured to illuminate at least a portion of an object with at least one wavelength of electromagnetic radiation;
at least one sensor configured to capture an image from the electromagnetic radiation reflected from the object; and a processor configured to generate a signal representative of an enhanced image based on a characteristic of the electromagnetic radiation reflected from the object, the signal being perceivable by a human observer, that systematically varies with time, and that is localized and does not obscure the captured image.

14. The system of claim 13, wherein the signal is an audible signal having one of a tone or a pattern that varies based upon a wavelength of electromagnetic radiation reflected by a portion of the object selected by a user.

15. The system of claim 13, included in an apparatus wearable by a human observer.

16. The system of claim 13, included in a camera having a viewfinder that displays the enhanced image.

17. The system of claim 13, wherein the projector is configured to project a time varying beam of the electromagnetic radiation on to the object from several independently adjustable sources configured to produce electromagnetic radiation in different respective frequency bands.

18. The system of claim 13, further including a screen including phosphorescent particles configured to fluoresce in response to exposure to electromagnetic radiation in one of an ultraviolet and an infrared band reflected from the object.

19. The system of claim 13, wherein the projector is configured to illuminate the image with a first color that is substantially indistinguishable from a second color by a color blind individual.

20. A method for ameliorating color blindness comprising:

illuminating an object with a first color that is substantially indistinguishable from a second color by a color blind individual, the object including portions colored with the first color and portions colored with the second color;

capturing an image of the object including the portions with the first color and the portions with the second color with a sensor;

producing an enhanced image with portions of the enhanced image including the first color augmented with a localized signal that is perceivable by the color blind individual that systematically and repeatably varies with time; and displaying the enhanced image.

* * * * *